United States Patent
Schnatterly et al.

(10) Patent No.: US 6,839,662 B2
(45) Date of Patent: Jan. 4, 2005

(54) COMMAND AND CONTROL SYSTEM ARCHITECTURE FOR CONVENIENT UPGRADING

(75) Inventors: Susan Elizabeth Schnatterly, Marlton, NJ (US); Spencer Allen Lord, San Francisco, CA (US); Joseph Martorana, Marlton, NJ (US); Henry William Canfield, Tabernacle, NJ (US); John Bockett Hunter, Riverton, NJ (US); Joseph John Chevere, Pennsauken, NJ (US); Yuriy Shlyakhter, Cherry Hill, NJ (US); Joseph Kevin Potts, Philadelphia, PA (US); Matthew William Petrosky, Princeton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 632 days.

(21) Appl. No.: 09/971,294

(22) Filed: Oct. 4, 2001

(65) Prior Publication Data

US 2004/0243378 A1 Dec. 2, 2004

Related U.S. Application Data

(60) Provisional application No. 60/313,282, filed on Aug. 17, 2001.

(51) Int. Cl.[7] .......................... G06G 7/48; H04B 7/185; B64D 1/04

(52) U.S. Cl. ................................ 703/6; 703/13; 703/8; 342/45; 342/357.01; 342/357.06; 342/357.07; 342/357.1; 342/357.13; 342/357.15; 342/357.17; 89/1.1; 89/1.11; 701/213; 701/200; 701/300; 701/302; 701/1

(58) Field of Search ............................. 703/2, 6, 8, 13, 703/20; 342/13, 20, 43, 44, 45, 46, 61, 63, 357.01, 357.07, 357.1, 357.13, 357.15, 357.17, 357.06; 89/1.1, 1.11; 701/1, 200, 213, 300, 302

(56) References Cited

U.S. PATENT DOCUMENTS

| | | | | |
|---|---|---|---|---|
| 5,020,411 A | * | 6/1991 | Rowan | 89/1.11 |
| 5,537,909 A | * | 7/1996 | Schneider et al. | 89/1.11 |
| 5,808,577 A | * | 9/1998 | Brinsfield | 342/45 |
| 5,960,097 A | * | 9/1999 | Pfeiffer et al. | 342/357.07 |
| 6,332,210 B1 | * | 12/2001 | Barkataki et al. | 717/100 |
| 6,552,681 B1 | * | 4/2003 | Hayward et al. | 342/357.06 |
| 6,765,498 B1 | * | 7/2004 | Sabatino | 342/13 |
| 6,771,214 B2 | * | 8/2004 | Kober et al. | 342/357.06 |

* cited by examiner

Primary Examiner—Bill D. Thomson
(74) Attorney, Agent, or Firm—Duane Morris LLP

(57) ABSTRACT

A military command and control system includes functional portions which respond to a set of or plurality of commands. Certain commands are mandatory. Specific responses are made in response to the mandatory commands. System tracks are handled differently than local tracks. Command and control systems which use the mandatory command structure are more readily upgraded than prior-art integrated command and control systems.

3 Claims, 16 Drawing Sheets

COMMAND AND CONTROL SYSTEM ARCHITECTURE FOR CONVENIENT UPGRADING

This patent application claims priority of provisional patent application Ser. No. 60/313,282, filed Aug. 17, 2001 in the name of Schnatterly et al.

FIELD OF THE INVENTION

This invention relates to military command and control systems which are configured in a manner which specifies certain mandatory responses to specified commands.

BACKGROUND OF THE INVENTION

Command and control systems include systems for controlling complex technological situations, such as control of weapons systems in a combat environment or simulation. These command and control systems may be exceedingly complex, because they may integrate inputs from diverse and numerous systems which are themselves complex systems. For example, a theatre command and control system may evaluate a large region of the globe, integrating inputs relating to visual observations, radar and sonar targets, infrared and other inputs from ships, aircraft and other vehicles in and around the region, and from fixed stations, and from a headquarters, to command and control various defensive and offensive weapons systems. It will be understood that such command and control systems must be very reliable.

In the prior art, such systems were built up by assigning various portions of the system to design groups. Each design group would then be responsible for completion of a particular portion of the command and control system. For example, FIG. 1 illustrates, in simplified form, a portion 10 of a prior art command and control system. In FIG. 1, the portion includes a plurality of sensors. In particular, FIG. 1 illustrates a radar sensor 12, an acoustic sensor 14, and an electronic warfare sensor system 16. These sensors are coupled, in some cases by bidirectional signal paths, to a track management portion 18 of the command and control system 10. In this context, the term "track" represents one "target" or other entity, such as a friendly aircraft. In radar terms, both friendly and unfriendly entities are termed "targets" or "tracks." The "track" terminology is used preferentially herein, but does not, in general, refer to the trajectory or path taken by a target, but rather refers to the current state or data configuration of the target. The track management portion 18, in turn, communicates by bidirectional paths with a command and decision system 20. The command and decision system 20, in turn, communicates with a plurality of weapons systems, two of which are illustrated as 22 and 24. Those interconnections in FIG. 1 which are not explicitly illustrated are represented by an asterisk-like arrow symbol 8. It will be appreciated that a complex system of this sort may include hundreds or thousands of subsystems such as those illustrated in FIG. 1, and a very large number of interconnections. During the design and integration phase of the construction of the command and control system of FIG. 1, the design teams for the various portions 21, 14, 16, 18, 20, 22, and 24 communicate with the members of the design teams for the adjacent portions of the system, in order to assure that the signals passing therebetween are sufficient to enable the processing in the adjacent systems, and compatible therewith. As a result of these interactions, each designer or team becomes very cognizant of the performance characteristics of the next adjacent elements of the command and control system being designed and manufactured. This knowledge tends to cause the "edges" of the various elements to merge or blend together, so that the command and control system tends to become a unitary whole. The blending of the system into a whole is generally a good thing, in that such a system tends to operate seamlessly, without artifacts associated with different modes of operation. An unobvious disadvantage of such a seamless system, however, is that it is difficult to make piecemeal improvements to single portions of the system. More particularly, the design of such an integrated system tends to be custom-made in each interface region. If an improved design for a particular portion or element of the overall command and control system 10 is desired at a time after the involved design personnel have gone on to other work, or after sufficient time for them to forget details of the various interfaces, the effort required to "re-engineer" that system portion to be upgraded to determine how it works at least has the effect of greatly increasing the cost of such an improvement. Even when the original designers are available, if the change requires new functionality, the integration makes change-out difficult and expensive.

Improved command and control systems are desired.

SUMMARY OF THE INVENTION

A military command and control system according to an aspect of the invention includes a track management group of components. The track management group of components includes a track repository component, a system track component, a correlation component, an identification component, and a local track component for each separate track associated with each system track component in the track repository. In this command and control system, the track repository component, (a) in response to a newTrack command, temporarily stores a new system track in the track repository, (b) in response to a getTrack command specifying a track, provides a reference to the requested track within the track repository, (c) in response to a getTracks command with specifying criteria, provides a reference to that set of tracks within the track repository which meets the specifying criteria, and if no criteria are specified, provides a reference to all tracks within the track repository, (d) in response to a removeTrack command specifying a track, removes the specified track from the set of tracks in the track repository, (e) in response to a removeTracks command including specifying criteria, removes from the track repository all tracks which meet the specified criteria, (f) in response to a removeAllTracks command, deletes from the track repository all currently stored tracks, (g) in response to a registerForAddEvent command, notifies the requester when a track is added to the track repository, and (h) in response to a RegisterForRemoveEvent command, notifies the requester when a track is removed from the track repository.

In another embodiment of this avatar of the invention, each system track component of the track management group of components (a) in response to a setIdentity command, fuses andor updates specified new track identity information with currently stored track identity information, (b) in response to a setPosition command, fuses andor updates new track kinematic information with currently stored track kinematic information, (c) in response to a setCharacteristics command, fuses andor updates new track characteristics with the currently stored track; (d) in response to a setSize command, fuses andor updates new track dimension information with the currently stored track dimension information, (e) in response to a getIdentity command, returns track identity data to the requesting component, (f) in response to a getPosition command, returns track kinematic data to the requesting component, (g) in response to a getCharacteristics command, returns track characteristic information to the requesting component, (h) in response to a getSize command, returns track dimension information to the requesting component, (i) in response to setUniqueID command including a specified unique identification, assigns the specified unique identification to the stored track, (j) in response to a getUniqueID command, returns the track identification to the requesting component, (k) in response to a setTrackData command, fuses andor updates track identity, track position, track characteristics, track size, and track identification with current track data, (l) in response to a getTrackData command, returns to the requesting component track identity, track kinematics, track characteristics, track size, and track identification, (m) in response to a posChangeRegister command, notifies the requestor when the track kinematics change in the system track component (n) in response to a IDChangeRegister, notifies the requester when the identity of the track changes, (o) in response to a charChangeRegister command, notifies the requester when the track characteristics change in the track storage, (p) in response to a sizeChangeRegister command, notifies the requesting component when the dimension of the track changes in the track storage, (q) in response to a getLocalTrackRefs command, returns a reference to the set of related local tracks, (r) in response to an addLocalTrackRef command, stores a reference to the specified local track component, (s) in response to a removeLocalTrackRef command, removes the reference to the specified local track component, (t) in response to a getRemoteRef command, returns a reference to the system track component, (u) in response to a setEngagedState command specifying an engaged state, stores the specified engaged state in the system track component, (v) in response to a getEngagedState command, returns the value of the engaged state in the system track component, (w) in response to a refChangeRegister command, notifies the requester when the set of associated local track component references change in the system track component.

In yet another embodiment of this aspect of the track management group of components of the command and control system according to this aspect of the invention, each local track component (a) in response to a setIdentity command specifying an identity, stores new track identity information in the local track component, (b) in response to a setPosition command specifying track kinematics, stores new track location and movement information in the local track component, (c) in response to a setCharacteristics command, stores new track characteristics in the local track component; (d) in response to a setSize command together with new dimension information, stores the new track dimension information in local track component, (e) in response to a getIdentity command, returns to the requesting component that track identity data stored in the local track component, (f) in response to a getPosition command, returns to the requesting component that track location and movement data stored in the local track component, (g) in response to a getCharacteristics command, returns track characteristic information to the requesting component, (h) in response to a getSize command, returns track dimension information to the requesting component, (i) in response to setUniqueID command, assigns the specified identification to the stored track, (j) in response to a getUniqueID command, returns the track identification to the requesting component, (k) in response to a setTrackData command, stores track identity, track kinematics, track characteristics, track size, and track identification in the local track component, (l) in response to getTrackData command, returns to the requesting component track identity, track kinematics, track characteristics, track size, and track identification (m) in response to posChangeRegister command, notifies the requestor when the track kinematics change in the local track component (n) in response to a IDChangeRegister command, notifies the requester when the track identity information of the local track component changes, (o) in response to charChangeRegister command, notifies the requestor when the track characteristics change in the local track component, (p) in response to sizeChangeRegister command, notifies the requesting component when the dimension of the track changes in the local track component, (q) in response to getSystemTrackRef command, returns a reference to the system track related to this local track component, (r) in response to setSystemTrackRef command, stores an association between the specified system track and this local track component, (s) in response to getRemoteRef, returns a reference to this local track component, (t) in response to sysTrackRefChangeRegister, notifies the requester when the associated system track changes in the local track component. In this embodiment, the correlation component (a) in response to a correlate command specifying a local track component, correlates the specified local track component with known system track components, if any, in the track repository, resulting in an association between the specified local track component and a system track component being stored in both the local and system track components, (b) in response to a correlateSynch command where a local track component is specified, correlates the specified local track component with known system track components in track repository, resulting in an association between the specified local track component and a system track component being stored in both the local and system track components, and returns the associated system track component to the requester, (c) in response to a correlateSynch command where track data is specified, correlates the specified track data with known system track components in the track repository, and returns the associated system track component to the requester. Also, the identification component (a) in response to determineIdentity command, performs processing one time in an attempt to determine or refine identification information about the specified system track (b) in response to checkIfFriend command, performs processing one time in an attempt to determine the specified system track component's friend or foe identity (c) in response to continuousCheckIfFriend command, performs processing continually in an attempt to determine the specified system track's friend or foe identity until either the track is determined to be a friend or the requester cancels the request (d) in response to idRecommendation command, validates and stores the friend or foe recommendation in the system track component.

According to a further aspect of the invention, the military command and control system also includes a weapons control group of components a weapon model group of components, a weapon selection component, and a mission coordination group of components. The weapons control group of components includes an engagement coordination component, a weapon model component, and a weapon selection component. The engagement coordination component (a) in response to engage command, performs processing coordinating, scheduling, and tasking of resources such as weapons and sensors to effect engagement against the specified target, or to affect the engagement after engagement begins, (b) in response to a getTarget command, returns a reference to the system track component representing the target of engagement to the requester, (c) in response to a getSalvoSize command, returns salvo size being used in engagement to the requester (d) in response to a getEngagementPriority command, returns priority of engagement to the requester, (e) in response to a setFireAuthorization command, stores fire authorization, (f) in response to a getFireAuthorization command, returns the currently stored value or state of fire authorization, (g) in response to a "cancel" command, performs processing to halt the engagement (h) in response to a holdFire command, performs processing to temporarily halt the engagement (i) in response to a removeHoldFire command, performs processing to resume the engagement, (j) in response to getEngagementStatus command, returns to the requester the status of the engagement, (k) in response to a registerForEngagementStatusChange command, notifies the requester of changes in the engagement status, Each weapon model component (a) in response to a testFeasibility command, returns the feasibility of using this weapon against the specified target to the requester, (b) in response to a calculateIntercept command, returns information about when and where the weapon will intercept the specified target to the requester, and (c) in response to a getCost command, returns to the requester cost information about the use of the weapon. Each weapon selection component (a) in response to a selectWeapon command, returns to the requester a set of weapons which are feasible for use against the specified target, (b) in response to an autoSelectWeapon command, returns to the requester the most feasible weapon to use against the specified target.

The mission coordination group of components includes a mission coordinator component, a resource scheduler component, an arbiter component, a constraint determining component and a mission registration component. The mission coordinator component (a) in response to getMissionStatus command, returns mission status information including engagement status to the requester, (b) in response to getMissionID command, returns the system-unique identifier for the mission to the requester, (c) in response to a getMissionType command, returns the type of mission to the requester, (d) in response to a registerForMissionStatusChange command, notifies the requester whenever the status information of the mission changes. The resource scheduler component (a) in response to a "schedule" command, attempts to reserve the specified resources at the specified times based on the specified priority, and returns the reservation information including the success or failure of the scheduling attempt to the requester, (b) in response to a "reschedule" command, removes the reservations on resources previously scheduled for the specified job, and then attempts to reschedule the specified resources at the specified times based on the specified priority, and returns the scheduling information including the success or failure of the rescheduling attempt to the requester, (c) in response to an extendJob command, attempts to extend the reservation on the specified resources based on the specified priority, and returns the scheduling information including success or failure of the scheduling attempt to the requester, (d) in response to a "cancel" command, removes reservations on resources for the specified job, (e) in response to a jobComplete command, removes remaining reservations on resources for the specified job, (f) in response to a resourceAvailable command, makes the specified resource available for scheduling, (g) in response to a resourceUnavailable command, makes the specified resource unavailable for scheduling, removes reservations on the resource, and notifies holders of reservations on the resource that the resource is no longer available. The arbiter component (a) in response to a "compare" command, returns to the requester the higher of the two specified priorities. The constraint determining component (a) in response to a calculateProfile command, returns to the requester the list of time intervals during which the constraint will be violated, (b) in response to a "check" command, returns to the requester information as to whether or not the constraint will be violated during the specified time interval, (c) in response to a registerForConstraintEvent command, notifies the requester when a change has occurred that will cause the constraint to be violated during the specified time interval, (d) in response to unregisterForConstraintEvent command, cancels future notifications to the requester on constraint changes, (e) in response to getFlexibility command, returns to the requester the percentage of time that the constraint will not be violated. The mission registration component (a) in response to a registerMission command, assigns a mission identifier, stores specified mission information, and returns the identifier to the requester, (b) in response to a deregisterMission command, updates the mission status to inactive, (c) in response to an updateMissionRegistration command, updates mission information for the specified mission, (d) in response to a registerForMissionRegisrationEvents command, notifies the requester when a mission is registered or deregistered, (e) in response to a getActiveMissions command, returns the list of all active missions currently registered, (f) in response to a getAllMissions command, returns the list of all missions that have been registered whether or not they have since been deregistered, (g) in response to a getMission command, returns mission information for the specified mission to the requester.

A military command and control system according to a further aspect of the invention, for use aboard a movable vehicle or vessel, further includes a navigation group of components. The navigation group of components includes an own-ship locator component, a heading control component, a drive control component, a compass component, a log component, and a navigator component. The own-ship locator component (a) in response to a getPosition command, returns to the requester the location and kinematics of ownship, the heading control component (a) in response to setHeading command, commands the heading controller of the ship to turn to the specified heading, the drive control component (a) in response to a setDrives command, commands the drive controllers of the ship as specified by the requester, (b) in response to setDrive command, commands the specified drive controller of the ship as specified by the requester, (c) in response to getDrives command, returns to the requester the current settings of the drive controllers of the ship, (d) in response to getDrive command, returns to the requester the current settings of the specified drive controller of the ship. The compass component (a) in response to getHeading command, returns to the requester the current reading of the ship's compass, (b) in response to isMagnetic command, returns to the requester whether the ship's compass is magnetic or not. The log component (a) in response to a getSpeed command, returns to the requester the current reading of the ship's log. The navigator component (a) in response to a getPosition command, returns to the requester the expected location and kinematics of own-ship at the specified future time, (b) in response to a getRoute command, returns to the requester the list of navigation waypoints which form or define the ship's future route, (c) in response to a getRoute command with a specified time interval, returns to the requester the list of navigation waypoints which form the ship's route within the specified time interval, (d) in response to getTurnRadius command, returns to the requester the stored value of turn radius of ownship, (e) in response to a setTurnRadius command, stores the specified value of turn radius of ownship, (f) in response to a registerForChange command, notifies the requester when the ship's future route changes, (g) in response to a registerForChange command where a time interval is specified, notifies the requester when the ship's route is expected to change within the time interval.

DESCRIPTION OF THE INVENTION

According to an aspect of the invention, a command and control system is constituted from portions or elements which, although integrated to the extent possible so as to form a seamless whole, specifies effective subdivision into particular elements or components, and for each such element or component, specifies a minimum of particular functions and functionality. According to an aspect of the invention, the command and control system includes a track management group of components, a weapons control group of components; and a mission coordination group of components. In a shipboard version of this aspect of the invention, the command and control system includes a navigation group of components. Within each group of components, various components are specified according to another aspect of the invention. As mentioned above, "track" represents one "target" or other entity, such as a friendly aircraft. In radar terms, both friendly and unfriendly entities are termed "targets" or "tracks." The "track" terminology is used preferentially herein, but does not, in general, refer to the trajectory or path taken by a target, but rather refers to the current state or data configuration of the target.

According to this other aspect of the invention, the track management group of components includes at least a track repository component, a system track component, a local track component, a correlation component, and an identification component. The weapons control group of components includes at least an engagement coordination component, a weapon model component, and a weapon selection component. The mission coordination group of components includes at least a mission coordinator component, a resource scheduler component, an arbiter component, and a constraint determining component and a mission registration component. The navigation group of components, if used, includes an own-ship locator component, heading control component, drive control component, compass component, log component, and a navigator component.

Figure 1:
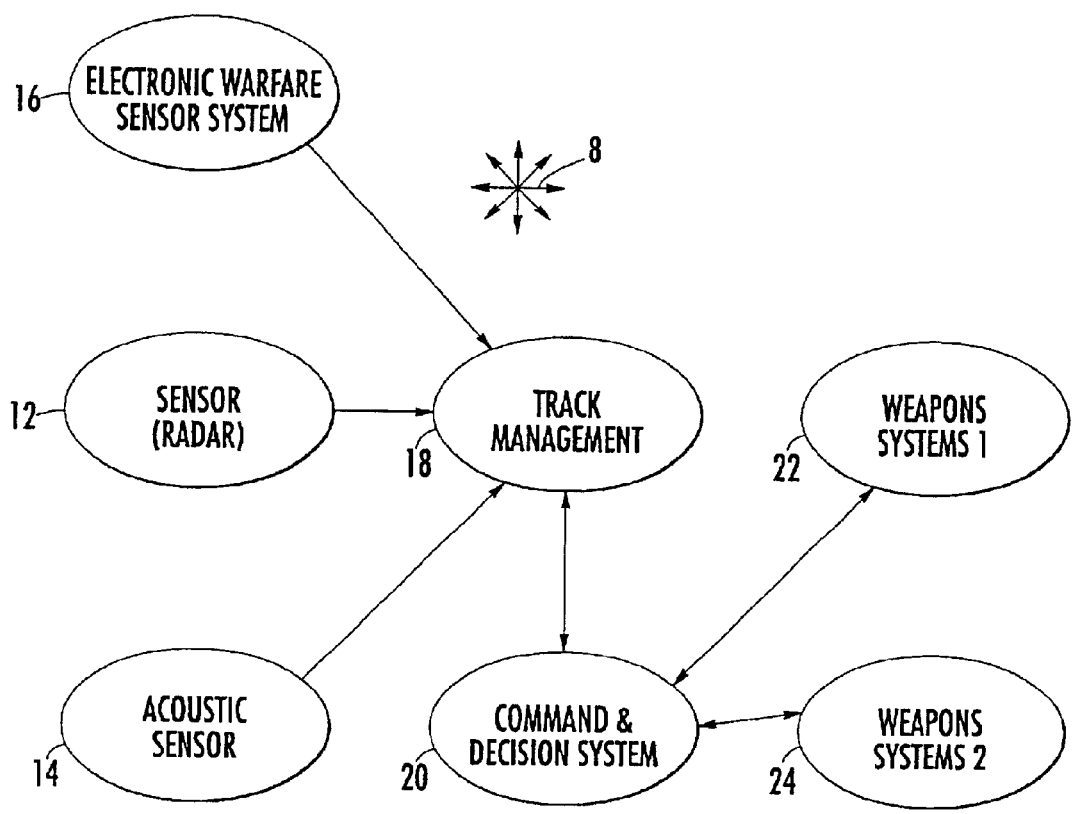
FIG. 1 is a simplified diagram illustrating a portion of a prior art command and control system including track management, command and decision system, weapons systems, and various sensors.
Figure 2A:
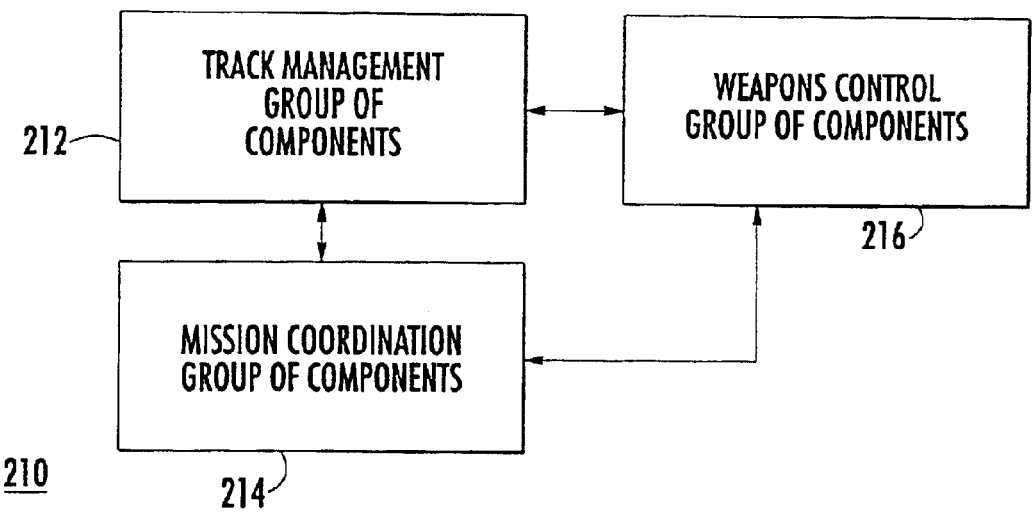
FIG. 2a is a simplified diagram illustrating a command and control system according to an aspect of the invention for use at a fixed location.
Figure 2B:
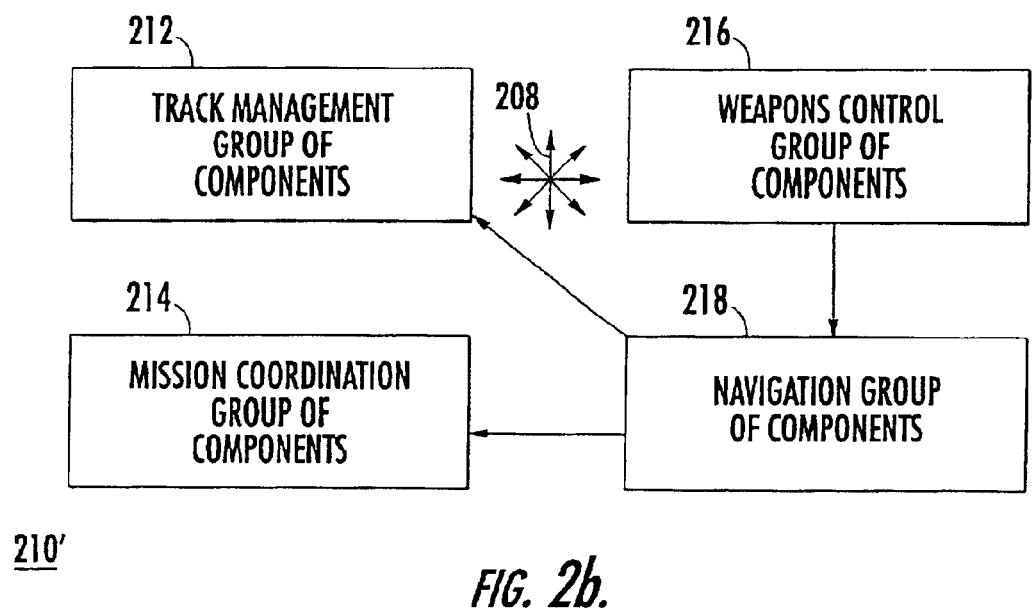
FIG. 2b is a simplified diagram illustrating a command and control system according to an aspect of the invention for use aboard a vehicle.

FIG. 2a is a simplified block diagram of a command and control system according to an aspect of the invention, suitable for general use at a fixed location. It should be particularly noted that the blocks illustrated therein principally represent software, but there may be hardware associated with at least some of the software. In FIG. 2a, a track management group of software components 212 interacts with a mission coordination group of software components 214 and a weapons control group of software components 216. As may be expected, each group of components communicates with all the other groups of components by various commands and references. It should be understood that the command and control system of FIG. 2a for use at a fixed site may operate using signals or inputs from both or either fixed sites and moving vehicles. FIG. 2b is a simplified block diagram of a command and control system for use in a situation in which the command and control system is mounted on, or associated with, a vehicle which is in motion. In FIG. 2b, the same groups of components 212, 214, and 216 are found which are used in the arrangement of FIG. 2a, but the arrangement of FIG. 2b also includes an own-vehicle or own-ship navigation group of components designated as 218. As in the case of FIG. 1, the components of FIG. 2b are coupled to each other by means of paths illustrated together as 208.

Figure 3:
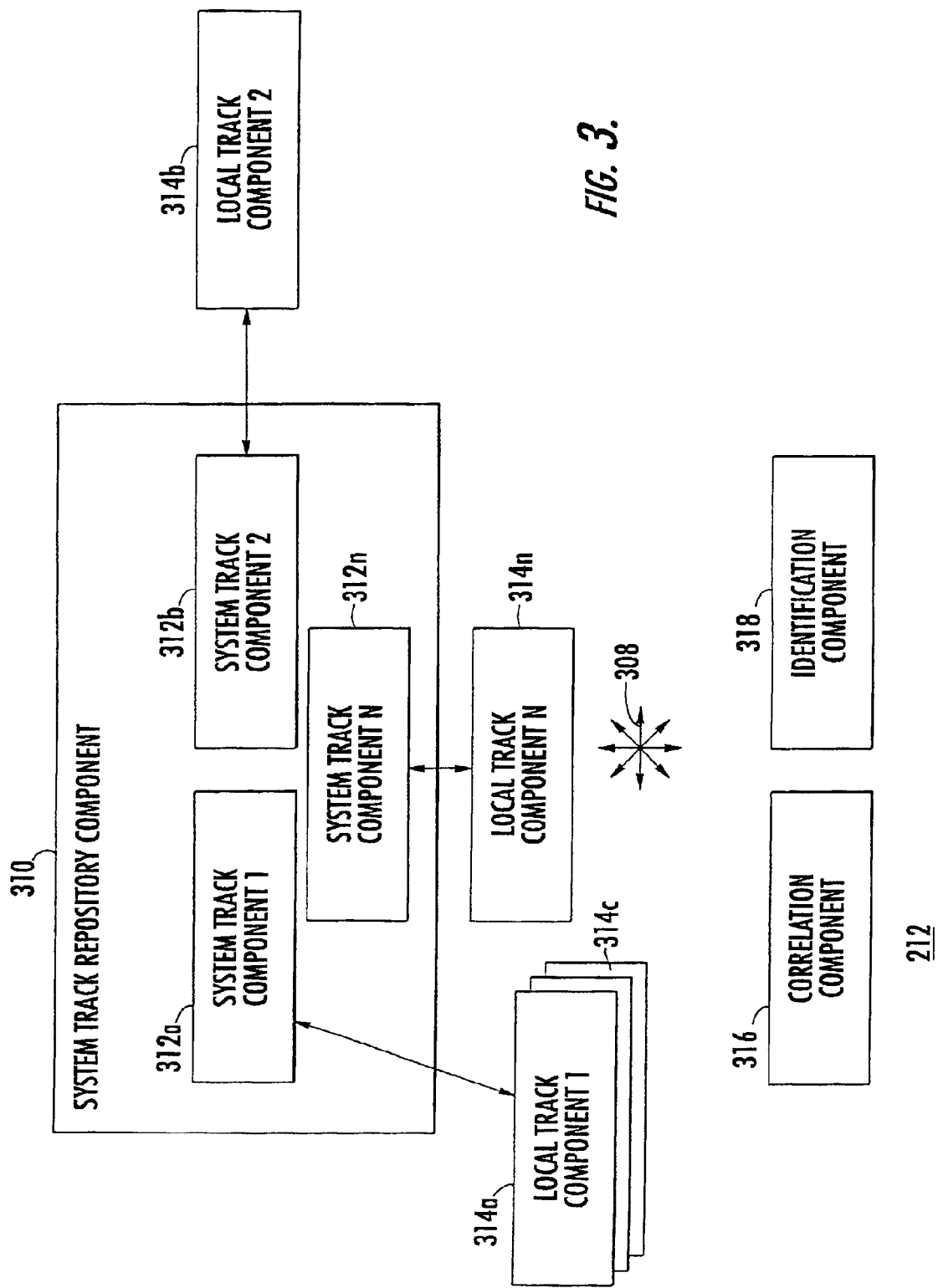
FIG. 3 is a simplified block diagram of a track management group of components which may be used in the arrangements of FIGS. 2a andor 2b.

FIG. 3 illustrates components which are required to be found, according to an aspect of the invention, in the track management group of components 212 of FIGS. 2a and 2b. As is the case with all the elements or components of the command and control system according to the various aspects of the invention, the elements illustrated in FIG. 3 are interconnected by various commands and references, which are illustrated together as 308. In FIG. 3, the track management group of components 212 includes a system track repository component 310, which temporarily stores, and controllably provides access to, various system track components, some of which are designated as 312a, 312b, . . . , 312n. Each system track component of set 312 of system track components includes data associated with a track. In particular, each system track component block of set 312 of system track component blocks represents the system's representation of a single track. The system's representation of a single track may be based on multiple signal inputs. The track management group of components 212 of FIG. 3 also includes a plurality of local track component blocks 314a, 314b, . . . 314n, each of which represent a single sensor's representation of a single track. Thus, system track component 312a represents the system's understanding of the data relating to a given track, and this understanding or data may arise from, or originate with, one or more local track components, such as local track component 314a, and from other such local track components (not illustrated). Similarly, system track component 312b represents the system's understanding of another track, and the understanding is based upon one or more local track components, such as local track component 314b, and system track component 312n represents the system's understanding of yet another track, and the understanding is based upon one or more local track components, such as local track component 314n.

The term "access" used in the description of FIG. 3 and at other places herein is used in its normal sense of making the subject matter available to an external agency. Those skilled in the art know that providing access is accomplished by "providing a reference" or "providing a reference to the requestor," and this "reference" can then be used to gain access to the data item in question. The "reference" terminology is used hereinafter.

The track management group of components 212 of FIG. 3 also includes a correlation component illustrated as a block 316 and an identification component illustrated as a block 318. Correlation component 316 represents or "is" a subsystem which correlates sensor inputs with known system tracks, thus forming relationships between the local track components and their nominally associated system track components. The identification component 318 adds to the track information characterizations such as "friend or foe," "aircraft or ship" or multiple-element characterizations, such as aircraft/ship/fixed-object/submarine characterizations.

Figure 4:
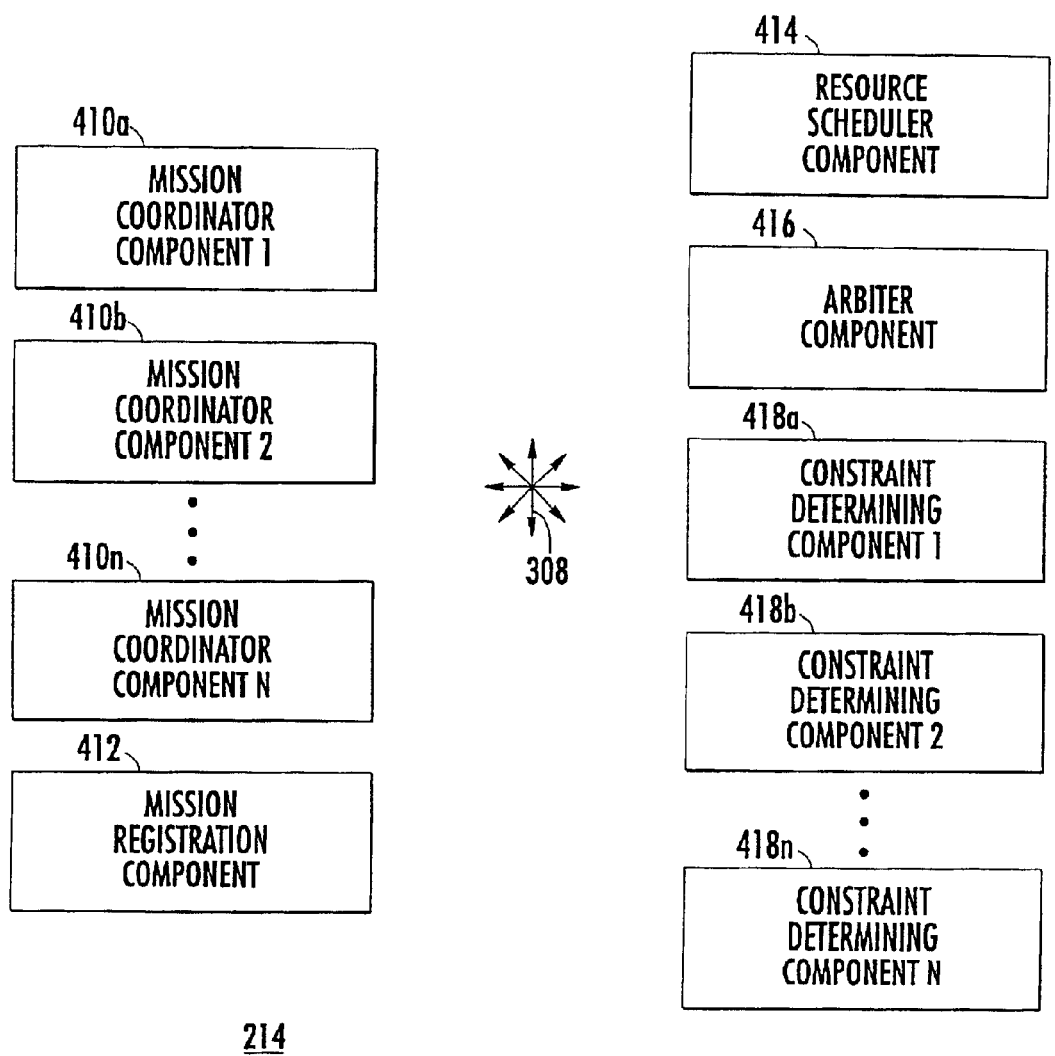
FIG. 4 is a simplified block diagram of a mission coordination group of components which may be used in the arrangements of FIGS. 2a andor 2b.

Details of the mission coordination group of components 214 of FIG. 2a or 2b are illustrated in FIG. 4. In FIG. 4, mission coordination group of components 214 includes a mission coordinator component illustrated as a block 410, which coordinates the subsystems of the command and control system to accomplish a single goal or mission. Thus, mission coordination group of components 214 may include a plurality of such blocks, others of which are designated 410b, . . . 410n, each for representing a concurrent mission. While the subscript "n" has been used elsewhere to indicate the last element of a plurality of elements, those skilled in the art will realize that "n" in general may refer to, or "mean," different numbers, although in some cases they may be equal. Mission coordination group of components 214 also includes a mission registration component illustrated as a block 412, which provides registration and also provides a reference to mission coordinator components such as 410a, 410b, . . . , 410n. Put more plainly, block 412 keeps track of all the various blocks 410 as they come into existence and expire or are fulfilled. Additionally, a resource scheduler component 414 schedules resources such as launchers, sensors, ships, and any other resources under the control of the overall command and control system 210, sufficient to accomplish the mission. Arbiter Block 416 of FIG. 4 provides arbitration among plural requesters (or requesters) of resources available to the resource scheduler 414. When multiple requests occur for the same resource within the same time period, a priority scheme may be used to assign the scheduled resource for the given time. Thus, some resources, such as rapid-fire cannon, can be used repeatedly, but a single cannon cannot fire at two different targets at the same time, and so the time allocation must be prioritized. It will be apparent that some resources, such as a specific missile, may be a single-use device, and time prioritization is not meaningful therewith. However determined, the priority is established in the first instance by the various mission coordinator components or blocks 410, which assign priority to their missions. For example, attack from the air might have priority greater than that for an attack from the sea. Similarly, the attacker's relative proximity might be considered as a factor in arbiting resource allocation. Finally, mission coordination group of components 214 of FIG. 4 includes a plurality of constraint determination or determining components, some of which are illustrated as blocks designated 418a, 418b, 418n. The constraint determining components impose environment-determined constraints on the resource allocations. For example, if a mission demands that a weapon be used, but the range of the target is beyond the range of the weapon selected due to relative motion after the selection of the weapon, the constraint determining component will provide information as to when the weapon cannot be used, and the resource scheduler component 414 must then schedule around the constraint. Similar types of constraints might result from weather conditions or unexpected target movements.

Figure 5:
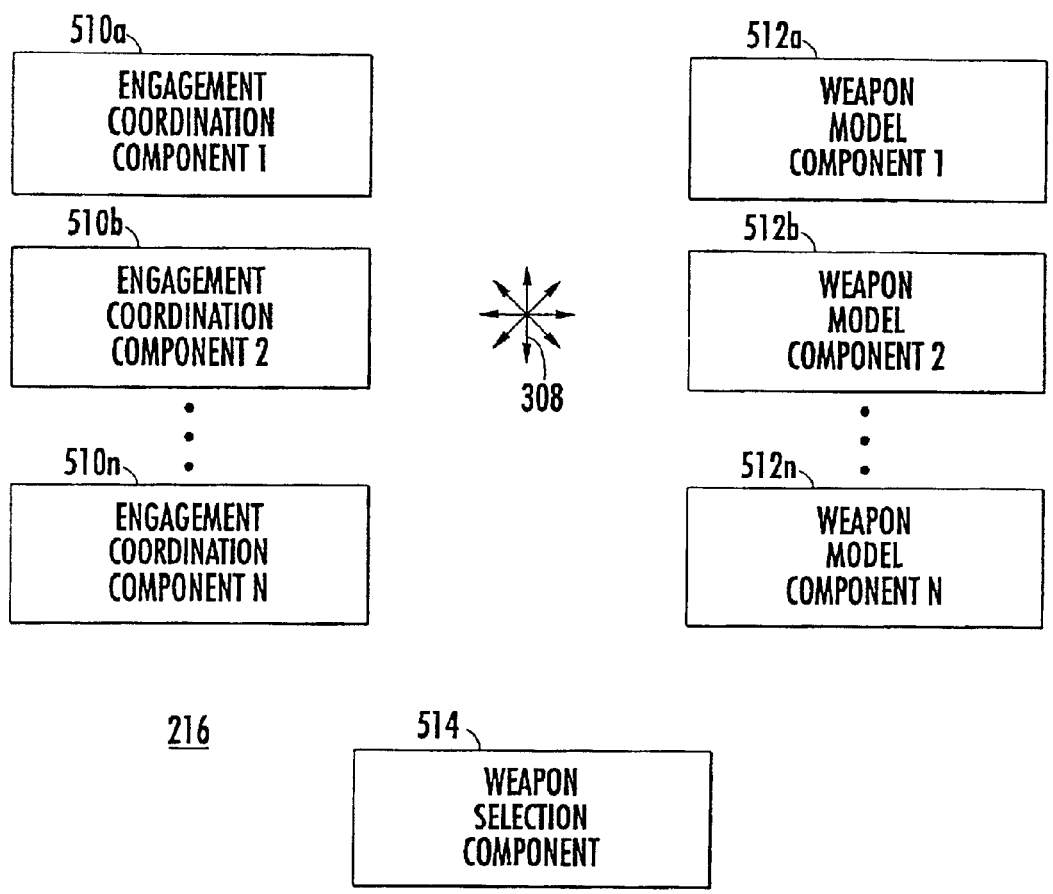
FIG. 5 is a simplified block diagram of weapons management group of components which may be used in the arrangements of FIGS. 2a andor 2b.

FIG. 5 is a simplified block diagram representing the weapons control group of components 216 of FIG. 2. In FIG. 5, the weapons group of components includes a plurality of engagement coordination component blocks 510a, 510b, . . . , 510n. Each engagement coordination block coordinates the actions needed or desirable to engage a single target with one kind of weapon. Thus, a variety of engagement coordination blocks must be available for association with a given target to be engaged. For example, if an airborne target is to be engaged, it may be desirable to have available a engagement coordinator block for each of an antiaircraft missile, a quick-firing cannon, and a short-range or close-in Phalanx-type weapon. The engagement coordinator for the missile would be used first, when the aircraft is at long range, and the others might be used if the missile failed to destroy the aircraft. It should be emphasized that the blocks in question are software, and consist of lines of code. There is no need to have any such engagement coordinator in existence unless its use is perceived to be imminent. If use is expected, the code can be replicated from a master source as many times as may be needed to fulfill the current requirements. There will be one (or possibly more, for purposes of reliability and redundancy) engagement coordinator type for each different weapon type or location, so the appropriate type would need to be replicated for a given use. In addition to the engagement coordination components of set 510 of components, weapons control coordinator 216 of FIG. 5 also includes a plurality of weapons model components 512*a*, 512*b*, . . . , 512*n*, each of which models a weapon from among those available for use. A weapon selector block 514 receives a request to select a weapon from among those available. In response to that request, weapon selector block 514 interrogates each weapon model 512*a*, 512*b*, . . . , 512*n*, to determine (a) whether the weapon which the weapon model represents can destroy the selected target, and if so, might ask the time required for destruction of the target, as measured from the time of the request. Another consideration might be the dollar cost of using the weapon, and the number of the such weapons remaining for use (this might be the number of such missiles remaining, or the amount of ammunition available for a given gun, or, in the case of a directed-energy weapon, the amount of available energy). Once the decision is made to use a particular weapon, weapon selector 514 returns the information to the requester (requester), which may then command use of one or more engagement coordination blocks. Each engagement coordination block 510*a*, 510*b*, . . . 510*n* may avail itself of information already determined by the corresponding weapon model, such as time-to-target, intercept point, and the like.

Figure 6:
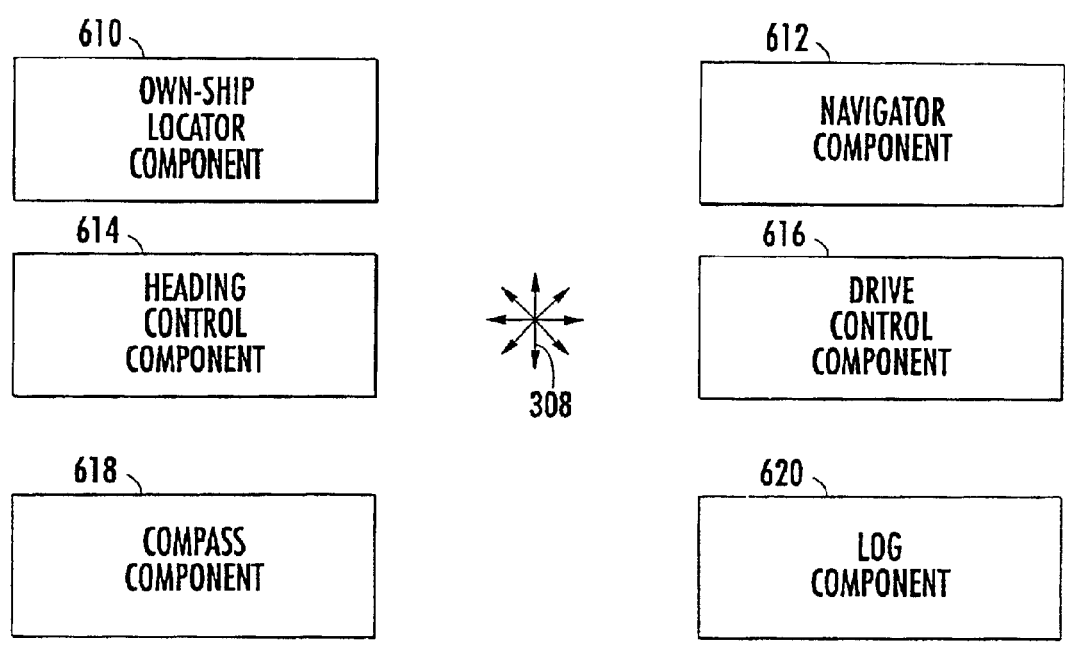
FIG. 6 is a simplified block diagram of a navigation group of components which may be used in the arrangement of FIG. 2b.

FIG. 6 is a simplified block diagram illustrating components of the navigation group of components 218 of FIG. 2*b*. In FIG. 6, block 610 represents an own-ship locator component, which determines the location of the ship or other vehicle on which it is mounted. This can be accomplished using inputs from a GPS receiver or other standard navigational tool or tools. In addition, own-ship locator component 610 determines the apparent course, which may be viewed as being the projection of the locus of past locations. Block 612 represents the navigator component of the navigation group of components, which provides to the other components of the command and control system the voyage plan or route which the ship is intended to follow. When on autopilot, the route can be determined from the programmed navigation system. However, when the ship is manually piloted, there may be no software-accessible route information. Block 612 provides such information regardless of the control mode, by simple projection of the current course, if necessary. Block 614 represents a heading control component, which provides a standard interface to the heading controls of a ship. The heading control block depends heavily on the characteristics of the ship's heading controls, which may not be simple rudder control, but may include bow and stern lateral thrusters, and directional control appendages other than a rudder. The input signals to the heading controller component will include signals defining a desired heading, but may include other signals which define constraint conditions which the heading controller may use to determine how to accomplish the desired heading, given the available resources. Block 616 represents a drive control component of the navigation group of components. Block 616 provides an interface to the ship's drive system, and applies the available drive control resources, under whatever constraints may apply, to the ship drive. Ship drive may include engine-driven propellers or paddles, automatically controlled sails, or whatever motive powers may be available. Block 618 of FIG. 6 represents a compass component, which, when interrogated, simply returns compass information. Block 620 represents a speed log component, which simply returns the ship's speed when interrogated.

Figure 7:
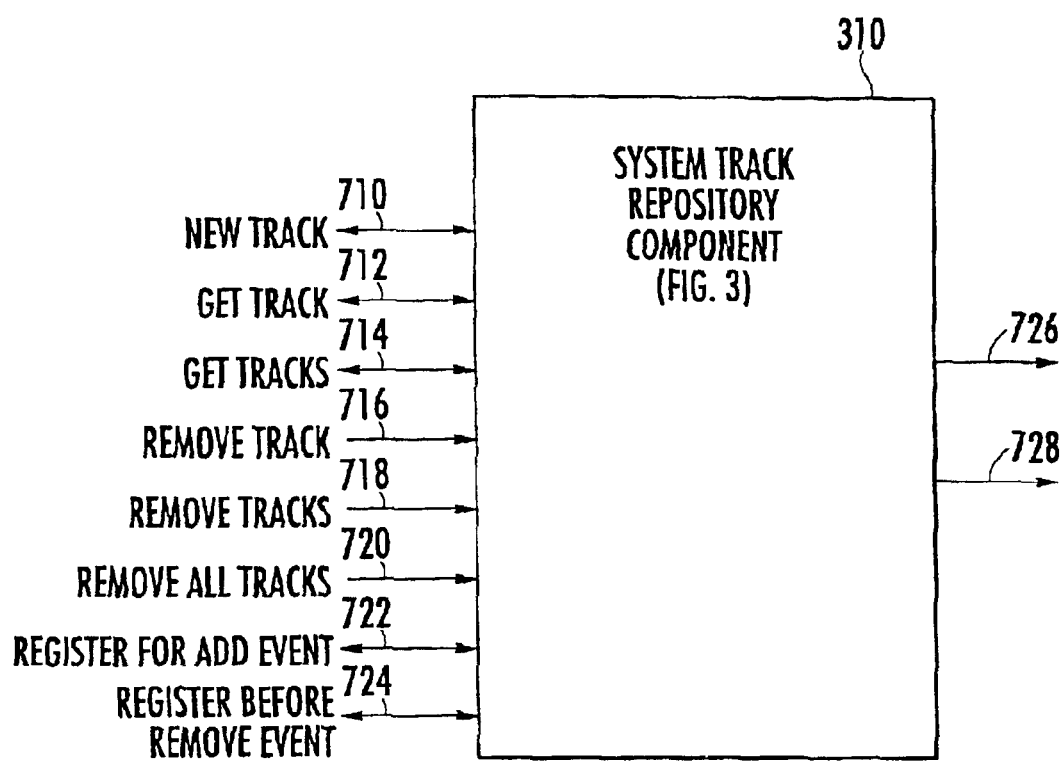
FIG. 7 is a simplified diagram illustrating the system track repository component portion of the track management group of components of FIG. 3.

According to an aspect of the invention, the components of the command and control system 210 of FIG. 2*a* or 2*b* include a defined interface which provides, as a minimum, certain functionality in response to commands from external (as to the particular component) sources. In particular, the track repository component 310 of FIG. 3, includes, as a minimum, the command inputs illustrated in FIG. 7. These command inputs may be viewed as "paths," "buses," or "ports" in a mechanistic view of the command and control system as a whole. In FIG. 7, input path, bus or port 710 to track repository component 310 represents a "newTrack" command, which commands the track repository to store a new track. In general, the new track data accompanies the newTrack command, thereby identifying the track data to be stored. The newTrack command may or may not specify a unique identifier for the track being stored or "created" by virtue of its presence in the repository. If a unique identifier is not provided with the newTrack command, the track repository 310 generates such an identifier. A reference (that is to say, access) is returned to the requesting entity or component, whereby the requesting entity can access or determine the unique identifier assigned by the track repository component, if desired. The reference is returned by way of the bidirectional nature of the software paths. The getTrack command is, or may be, applied to input 712 from a remote component within the command and control system. The getTrack command also specifies the unique identification of the requested track. The track repository component 310 returns to the requesting component a reference to the identified track, again by way of bidirectional paths or software "buses". The getTracks (with an S) command, if and when it is applied to block 310 by way of input or path 714 from a remote component of the command and control system (remote, that is, relative to the system track repository component 310, but possibly physically adjacent), and provides a reference to the set of tracks meeting the specified criteria, and if no criteria are specified, returns a reference to all the tracks. The removeTrack command applied from an external component to port 716 of block 310, specifying a track to be removed by means of the unique identifier, results in removal from the track repository of the specified track. No return is made. The removeTracks (with an S) command, when applied to input 718 together with specifying criteria, results in removal from the store of those tracks meeting the specified criteria. A separate command, removeAllTracks, when applied to block 310 by way of input logic port or logic path 720, results in removal of all tracks currently stored. No return is made. The registerForAddEvent command, when applied to input 722, causes the track repository component 310 to notify the requesting component when a track is added to the track repository. An event registration is immediately returned to the requesting component, which identifies the fact that the requesting component has the functionality stored in the track repository; this registration may be used to cancel the command for notification. In the absence of such a event notification registration, there would be no way to "turn off" the registration, with the result that the track repository would eventually be required to report, possibly to all components, each time a new track was added. This registration results in notification to the requesting component of the fact of storage of a new track in the track repository. The return, if and when made, may be viewed as exiting from the track repository block 310 by way of a path 726. A RegisterForRemoveEvent command, when applied by way of input port or path 724, causes the track repository 310 to notify the requester (or requester) of the fact that a track has been removed from the track repository, and identifies the removed track. The notification, if and when made, may be viewed as exiting from the track repository block 310 by way of a path 728.

While the newTrack command as described herein provides alternative functions, in an actual embodiment of the invention, two separate commands are used instead. This makes no actual difference in the operation, but is merely a particular way to arrange the software. Similarly, the getTracks command has been described with alternative functions, and may actually be implemented as separate commands, if desired.

It should be noted that those skilled in the art of software development do not necessarily think in terms of logic ports or logic paths, but instead consider these concepts to be in the nature of "methods in (or on) an interface."

Figure 8:
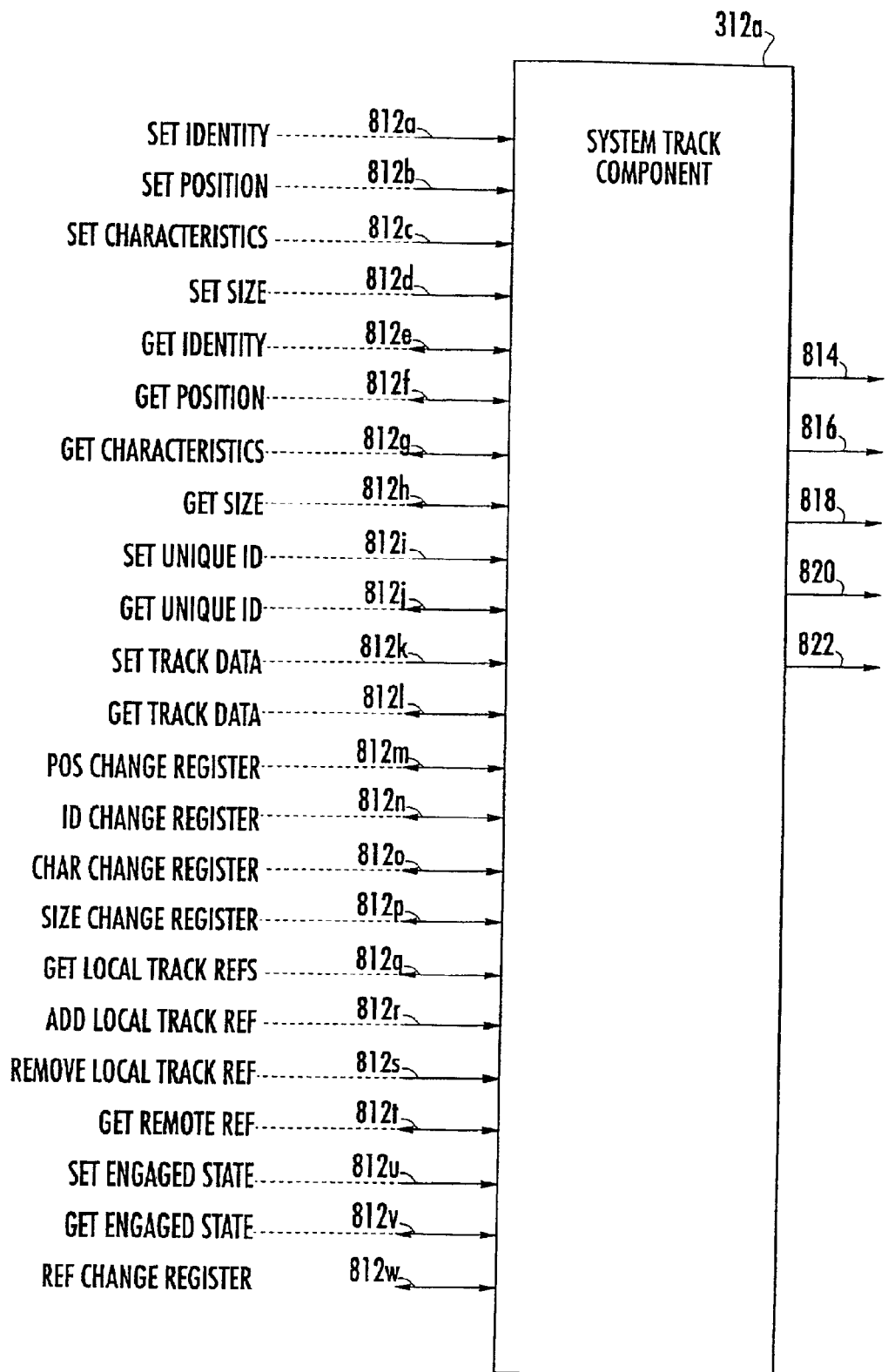
FIG. 8 is a simplified diagram illustrating the system track component portion of the track management group of components of FIG. 3.

FIG. 8 represents one of the system track components of FIG. 3, and for definiteness, represents system track component 312a of FIG. 3. In FIG. 8, system track component 312a includes a total of twenty-three specified or mandatory input ports or paths according to this aspect of the invention, designated 812a, 812b, 812c, 812d, . . . 812w, collected into two groups. The first group includes input ports or paths 812a through 812p, and relates to those input commands which are applicable to both system track and local track components. The second group includes 812q through 812w, and relates to those commands which are specific to a system track component. The first command, namely setIdentity, may be, or is applied to input 812a from a remote component, which also specifies the new identity information. The system track component 312a fuses or updates the new track identity information with the currently stored track identity information. The term "fuses" or "fusing" refers to the merging of two or more sets of information or data, resulting in a single set of information or data. The setPosition command may be, or is, applied to input 812b from a remote component, which also specifies the new location and kinematic information. The system track component 312a fuses or updates the new track location and kinematic information with the currently stored track location and kinematic information. The setCharacteristics command may be, or is, applied to input 812c from a remote component of the command and control system, which also specifies the new track characteristics information. The system track component 312a fuses or updates the new track characteristics information with the currently stored track characteristics information. The setSize command may be, or is, applied to input 812d from a remote component, which also specifies the new track dimension information. In this context, the "dimension" of a track is what might otherwise be termed "the physical size of the target." The system track component 312a fuses or updates the new track dimension information with the currently stored track dimension information. The getIdentity command may be, or is, applied to input 812e from a remote component of the command and control system. The system track component 312a returns the currently stored track identification information to the requesting component by way of the associated bidirectional path; in essence, the system track component 312a is simply identifying itself, as each system track component "contains" or pertains to but one track. The getPosition command may be, or is, applied to input 812f from a remote component. The system track component 312a returns the currently stored track kinematic information to the requesting component by way of bidirectional path. The getCharacteristics command may be, or is, applied to input 812g from a remote component of the command and control system. The system track component 312a returns the currently stored track characteristics information to the requesting component by way of the bidirectional path. The getSize command may be, or is, applied to input 812h of block 312a from a remote component. The system track component 312a returns the currently stored track dimension information to the requesting component by way of bidirectional path. The setUniqueID command may be, or is, applied to input 812i from a remote component of the command and control system, which also specifies the unique identifier. The system track component 312a stores the specified unique identifier. The getUniqueID command may be, or is, applied to input 812j from a remote component. The system track component 312a returns the currently stored unique identifier to the requesting component by way of bidirectional path. The setTrackData command may be, or is, applied to input 812k from a remote component, which also specifies the new track data information including track identity, track position, track characteristics, track size, and unique identifier. The system track component 312a fuses or updates the new track data information with the currently stored track data information. The getTrackData command may be, or is, applied to input 812l from a remote component of the command and control system. The system track component 312a returns the currently stored track data including track identity, track position, track characteristics, track size, and unique identifier to the requesting component by way of bidirectional path. The posChangeRegister command may be, or is, applied to input 812m from a remote component. The system track component 312a notifies the requester of any change to the track's location and kinematic information that may happen in the future, until the requester cancels the registration. An event registration is immediately returned to the requesting component, which identifies the fact that the requesting component has the functionality stored in the system track component; this registration may then eventually be used to cancel the command for notification. The subsequent notification of a change to the track's location and kinematic data, if and when made, may be viewed as exiting from the system track component 312a by way of a path 814.

The idchangeregister command may be, or is, applied to input 812n of system track component block 312a of FIG. 8 from a remote component of the command and control system. The system track component 312a notifies the requester of any change to the track's identity information that may happen in the future until such time as the requester cancels the registration. An event registration is immediately returned to the requesting component, which identifies the fact that the requesting component has the functionality stored in the system track component; this registration may be used to cancel the command for notification. The subsequent notification of a change to the track's identification data, if and when made, may be viewed as exiting from the system track component 312a by way of a path 816. The charChangeRegister command may be, or is, applied to input 812o from a remote component. The system track component 312a notifies the requester of any change to the track's characteristics information that may happen in the future until the requester cancels the registration. An event registration is immediately returned to the requesting component, which identifies the fact that the requesting component has the functionality stored in the system track component; this registration may be used to cancel the command for notification. The subsequent notification of a change to the track's characteristics data, if and when made, may be viewed as exiting from the system track component 312a by way of a path 818. The sizeChangeRegister command may be, or is, applied to input 812p from a remote component. The system track component 312a notifies the requester of any change to the track's dimensional information that may happen in the future until the requester cancels the registration. An event registration is immediately returned to the requesting component, which identifies the fact that the requesting component has the functionality stored in the system track component; this registration may be used to cancel the command for notification. The subsequent notification of a change to the track's dimensional data, if and when made, may be viewed as exiting from the system track component 312a by way of a path 820. The getLocalTrackRefs command may be, or is, applied to input 812q from a remote component. The system track component 312a returns references to the local track component or components that are associated with the system track component to the requesting component by way of bidirectional path. As mentioned above, the local track component or components that are associated with a system track component provide the data upon which the system bases its understanding of an external entity represented by a system track component.

The addLocalTrackRef command may be, or is, applied to input 812r of block 312a of FIG. 8 from a remote component of the command and control system, which also specifies the local track component reference to be added.

The system track component 312a adds the reference to the local track component to its storage.

The removeLocalTrackRef command may be, or is, applied to input 812s from a remote component of the command and control system, which also specifies the local track component reference to remove. The system track component 312a responds by removing the reference to the local track component from its storage. The getRemoteRef command may be, or is, applied to input 812t from a remote component. The system track component 312a returns the network-remote reference of itself to the requesting component by way of the bidirectional path. The setEngagedState command may be, or is, applied to input 812u from a remote component of the command and control system, which remote component also specifies the engaged state. The engaged state indicates whether the entity represented by this system track component is under prosecution by the command and control system or not. For example, a track entity is "engaged" when the command and control system determines that it is a threat, and weapons should be brought against it. The system track component 312a stores the specified engaged state. The getEngagedState command may be, or is, applied to input 812v from a remote component. The system track component 312a returns the currently stored engaged state data to the requesting component by way of the bidirectional path. The refChangeRegister command may be, or is, applied to input 812w from a remote component. The system track component 312a notifies the requester of any change to the set of associated local track components that may happen in the future until the requester cancels the registration. An event registration is immediately returned to the requesting component, which identifies the fact that the requesting component has the functionality stored in the system track component; this registration may be used to cancel the command for notification. The subsequent notification of a change to the set of associated local track components, if and when made, may be viewed as exiting from the system track component 312a by way of a path 822.

Figure 9:
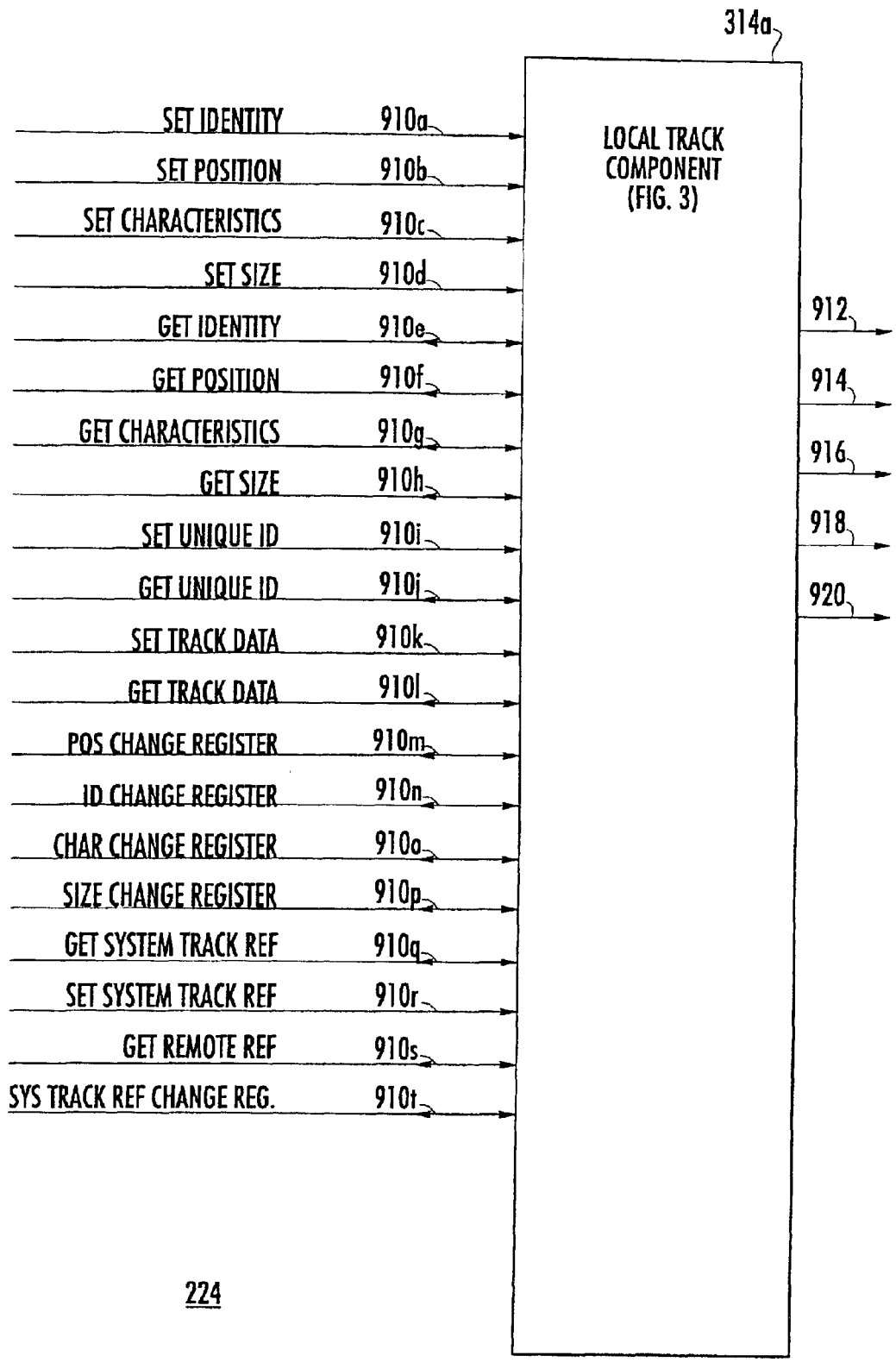
FIG. 9 is a simplified diagram illustrating the local track component portion of the track management group of components of FIG. 3.

FIG. 9 represents one of the local track components, and for definiteness, represents local track component 314a of FIG. 3. In FIG. 9, local track component 314a includes a total of twenty specified or mandatory input ports or paths according to this aspect of the invention, designated 912a, 912b, 912c, 912d, . . . 912t, collected into two groups. The first group includes input ports or paths 912a through 912p, and relates to those input commands which are applicable to both system track and local track components. The second group includes 912q through 912t, and relates to those commands which are specific to a local track component. The first command, namely setIdentity, may be, or is, applied to input "port" 910a from a remote component, which also specifies the new identity information. The local track component 314a stores the new track identity information, thereby overwriting the currently stored track identity information. The local track component then sends a command to its associated system track component to update the system track component's identity information given the new identity information. The setPosition command may be, or is, applied to input 910b from a remote component, which also specifies the new location and kinematic information. The local track component 314a stores the new track location and kinematic information, overwriting the currently stored track location and kinematic information. The local track component then sends a command to its associated system track component to update the system track component's location and kinematic information given the new location and kinematic information. The setCharacteristics command may be, or is, applied to input 910c from a remote component, which also specifies the new track characteristics information. The local track component 314a stores the new track characteristics information, overwriting the currently stored track characteristics information. The local track component then sends a command to its associated system track component to update the system track component's characteristics information given the new characteristics information. The setSize command may be, or is, applied to input 910d from a remote component, which also specifies the new track dimension information. The local track component 314a stores the new track dimension information, overwriting the currently stored track dimension information. The local track component then sends a command to its associated system track component to update the system track component's track dimension information given the new track dimension information.

The getIdentity command may be, or is, applied to input 910e of local track component 314a of FIG. 9 from a remote component. The local track component 314a returns the currently stored track identification information to the requesting component by way of bidirectional path; as mentioned in conjunction with the system track component 312a of FIG. 8, the local track identification is simply the self-identification of the local track component, since there is only one local track associated with any local track component. The getPosition command may be, or is, applied to input 910f from a remote component. The local track component 314a returns the currently stored track location and kinematic information to the requesting component by way of the bidirectional path. The getCharacteristics command may be, or is, applied to input 910g from a remote component. The local track component 314a returns the currently stored track characteristics information to the requesting component by way of bidirectional path. The getSize command may be, or is, applied to input 910h from a remote component. The local track component 314a returns the currently stored track dimension information to the requesting component by way of bidirectional path. The setUniqueID command may be, or is, applied to input 910i from a remote component, which also specifies the unique identifier. The local track component 314a stores the specified unique identifier as its own identity. The getUniqueID command may be, or is, applied to input 910j from a remote component. The local track component 314a returns the currently stored unique identifier to the requesting component by way of bidirectional path. The setTrackData command may be, or is, applied to input 910k from a remote component, which also specifies the new track data information including track identity, track position, track characteristics, track size, and unique identifier. The local track component 314a stores the new track data information, overwriting the currently stored track data information. In this instance, all the data must be provided, notwithstanding that only one aspect or component thereof is to be changed. The getTrackData command may be, or is, applied to input 9101 from a remote component. The local track component 314a returns to the requesting component the currently stored track data including track identity, track position, track characteristics, track size, and unique identifier to the requesting component by way of bidirectional path.

The posChangeRegister command may be, or is, applied to input 910m from a remote component. The local track component 314a notifies the requester of any change to the track's location and kinematic information that may occur in the future until such time as the requester may cancel the registration. An event registration is immediately returned to the requesting component, which identifies the fact that the requesting component has the functionality stored in the local track component; this registration may be used to cancel the command for notification. The subsequent notification of a change to the track's location and kinematic data, if and when made, may be viewed as exiting from the local track component 314a by way of a path 912.

The idchangeregister command may be, or is, applied from a remote component to input 910n of local track component 314a of FIG. 9. In response, the local track component 314a notifies the requester of the occurrence of any change to the track's identity information that may happen in the future, until the requester cancels the registration. An event registration is immediately returned to the requesting component, which identifies the fact that the requesting component has the functionality stored in the local track component; this registration may be used to cancel the command for notification. The subsequent notification of a change to the track's identification data, if and when made, may be viewed as exiting from the local track component 314a by way of a path 914. The charChangeRegister command may be, or is, applied to input 910o from a remote component. In response, the local track component 314a notifies the requester of any change to the track's characteristics information that may happen in the future, until such time as the requester cancels the registration. An event registration is immediately returned to the requesting component by the bidirectional path. The event registration identifies the fact that the requesting component has the functionality stored in the local track component; this registration may be used to cancel the command for notification. The subsequent notification of a change to the track's characteristics data, if and when made, may be viewed as exiting from the local track component 314a by way of a path 916. The sizeChangeRegister command may be, or is, applied to input 910p from a remote component. In response, the local track component 314a notifies the requester of any change to the track's dimensional information that may happen in the future until the requester cancels the registration. An event registration is immediately returned to the requesting component, which identifies the fact that the requesting component has the functionality stored in the local track component; this registration may be used at a later time to cancel the command for notification. The subsequent notification of a change to the track's dimensional data, if and when made, may be viewed as exiting from the local track component 314a by way of a path 918.

The getSystemTrackRef command may be, or is, applied to input 910q from a remote component. The local track component 314a returns to the requesting component, by way of the bidirectional path, the reference to the system track component that is associated with the local track component 314a. As mentioned previously, the local track component either alone or together with other local track components provides the basis for the command and control system's understanding of an external entity represented by a system track component. Thus, each local track component is associated with one, and only one system track component. The setSystemTrackRef command may be, or is, applied to input 910r from a remote component, which also specifies the system track component reference to be added. The local track component 314a adds the reference to the system track component to its storage, overwriting any previously stored reference. The getRemoteRef command may be, or is, applied to input 910s from a remote component. The local track component 314a returns the network-remote reference of itself to the requesting component by way of bidirectional path. The sysTrackRefChangeRegister command may be, or is, applied to input 910t from a remote component. The local track component 314a responds by notifying the requester of any change to the system track component reference that may happen in the future until the requester cancels the registration. Also, an event registration is immediately returned to the requesting component, which identifies the fact that the requesting component has the functionality stored in the local track component; this registration may be used to cancel the command for notification. The subsequent notification of a change to the system track component reference, if and when made, may be viewed as exiting from the local track component 314a by way of a path 920.

Figure 10:
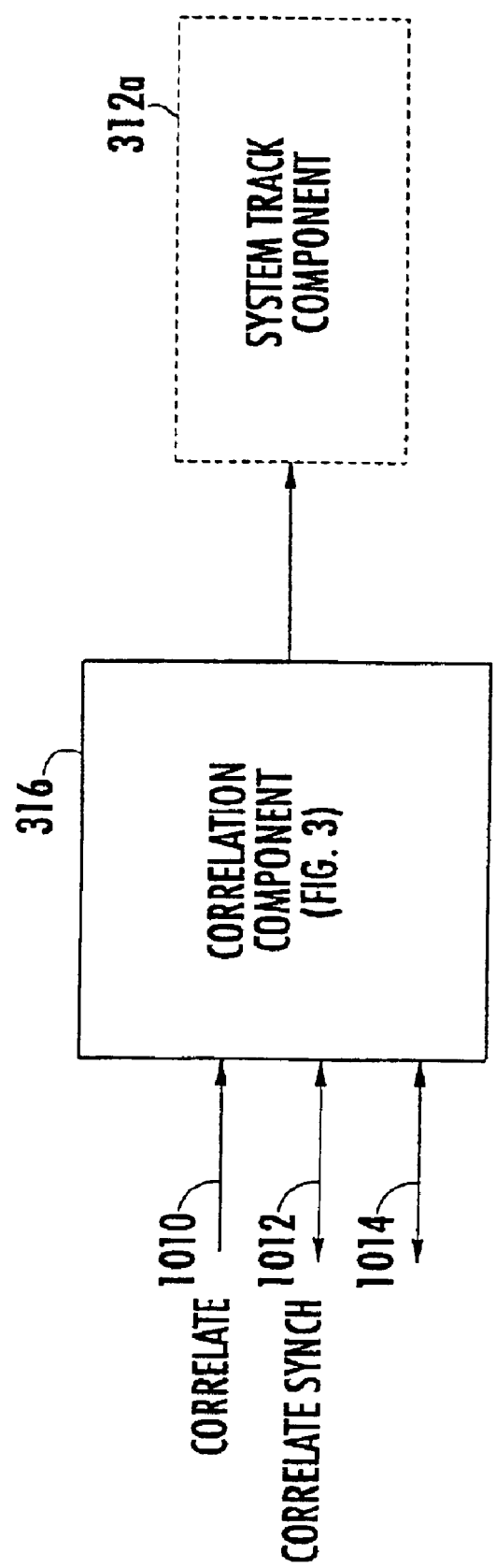
FIG. 10 is a simplified diagram illustrating the correlation component portion of the track management group of components of FIG. 3.

The correlation component 316 of FIG. 3, as illustrated in more detail in FIG. 10, includes, as a minimum, three command inputs. The first command, namely correlate, may be, or is, applied to input 1010 from a remote component, which also specifies the local track component to correlate. The correlation component 316 reviews candidate system track components 312a, 312b, . . . , 312N in the system track repository component 310 in order to determine whether the specified local track component should be associated with an existing system track component. If the correlation component decides that the specified local track component should be associated with a specific system track component, the correlation component 316 commands the local track component to add to its storage the reference to the selected system track component. The correlation component then commands the system track component to add to its storage the reference to the local track component. For example, if correlation component 316 decides that a new local track component, say local track component 314c of FIG. 3, relates to system track component 312a, it commands the system track component 312a to store a reference to local track component 314c, and commands local track component 314c to store a reference to system track component 312a, thereby associating each with the other. If, on the other hand, the correlator determines that the new local track component should not be associated with any existing system track component, the correlator will command the system track repository component to create a new system track component within the system track repository. The correlator will then command the local track component to add the new system track component's reference to its storage, and command the newly formed system track component to add the local track component's reference to its storage.

The correlateSynch command may be, or is, applied from a remote component to input 1012 of correlation component 316 of FIG. 10, when it specifies the local track component to correlate. The correlator functions as described for input 1010 as to the specified local track component. After performing the correlation, correlation component 316 returns to the requesting component, by way of the bidirectional path, the system track component reference of the correlated system track component. Thus, the only difference between the correlateSynch command and the correlate command is that the system track reference is returned in the case of correlateSynch command, which implies that correlateSynch must execute immediately.

The correlateSynch command may be, or is, applied to input 1014 from a remote component, and may specify local track data to correlate instead of local track component. Local track data differs from the local track component mentioned above in that the one is data, and the other a specification of a component. The correlation component reviews candidate system track components 312a, 312b, . . . , 312N in the system track repository component 310 in order to determine whether the specified local track data should be added to an existing system track component. If the correlator decides that the specified local track data should be added to a specific system track component, the correlator will command the system track component to update its track data based on the inputted local track data. If the correlator determines that the local track data should not be added to any existing system track component, the correlator will command the system track repository component to create a new system track component within the system track repository. The correlator will then command the system track component to update its track data based on the inputted local track data. The correlator then returns the system track component reference of the correlated system track component to the requesting component by way of bidirectional path.

Figure 11:
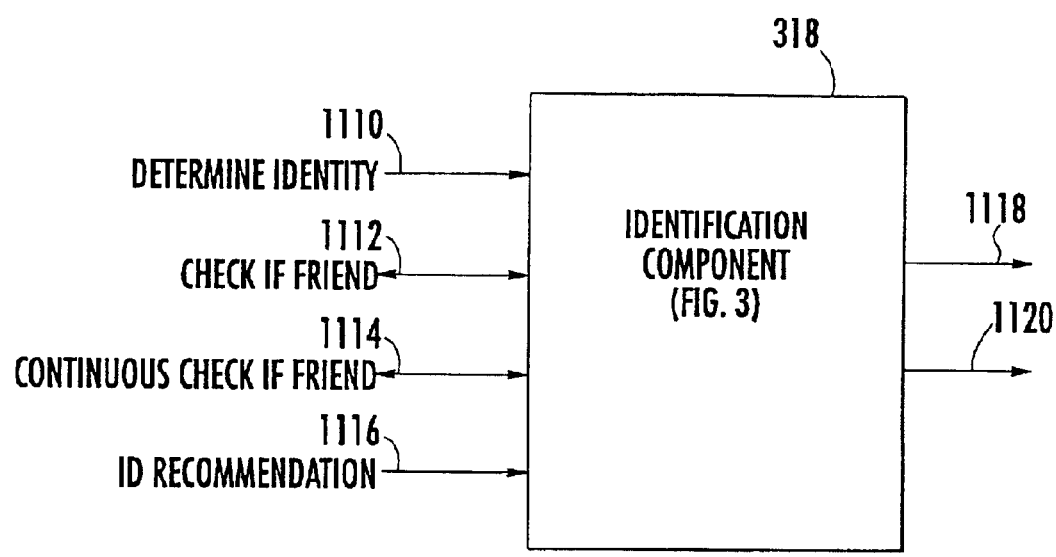
FIG. 11 is a simplified diagram illustrating the identification component portion of the track management group of components of FIG. 3.

The identification component 318 of FIG. 3 includes, as a minimum, the command inputs illustrated in FIG. 11. The first command, namely the determineIdentity command, may be, or is, applied to input 1110 from a remote component, which also specifies the system track component to identify. The identification component performs processing, possibly utilizing other system components or equipment, in order to determine or refine identification information about the entity represented by the specified system track component. For example, the identification component might use Identification Friend or Foe (IFF) equipment to determine the friend or foe status of a track. In equipments not fitted with IFF devices, the operator of the command and control system may be queried for identification information. The checkIfFriend command may be, or is, applied to input 1112 from a remote component, which also specifies the system track component to check. The identification component performs processing, again possibly utilizing other system components or equipment, in an attempt to determine the friend or foe identity of the entity represented by the specified system track component. The identification component 318 notifies the requester if the entity is determined to be a friend or not. An event registration is immediately returned to the requesting component, which identifies the fact that the requesting component has the functionality stored in the identification component; this registration may be used to cancel the command for notification. An event registration is used in this case because the process of determining friend or foe identity may take a period of time. The subsequent notification of the system track component's identity may be viewed as exiting from the identification component 318 of FIG. 11 by way of a path 1118. The continuousCheckIfFriend command may be, or is, applied to input 1114 from a remote component, which also specifies the system track component to check. The identification component 316 responds by performing continual or continuous processing as described above in an attempt to determine the friend or foe identity of the entity represented by the specified system track component. The identification component 318 notifies the requester if and when the entity is determined to be a friend. An event registration is immediately returned to the requesting component, which identifies the fact that the requesting component has the functionality stored in the identification component; this registration may be used to cancel the command for notification. The subsequent notification of the change of the system track component to a friend, if and when made, may be viewed as exiting from the identification component 318 by way of a path 1120. The idrecommendation command may be, or is, applied to input 1116 from a remote component, which also specifies the system track component and recommended identity data to apply. The identification component 318 validates the identity data and if valid, commands the specified system track component to set its identity data to the specified identity data. The result of the validation is returned to the requesting component by way of the bidirectional path. For example, once an IFF return is made indicating a friendly track, the assignment of "foe" status by a system operator would be an invalid input. It is recognized that the use of such a command is a policy decision, which may or may not be used in various states (battle, peacetime dockside, and the like) of the command and control system.

Figure 12:
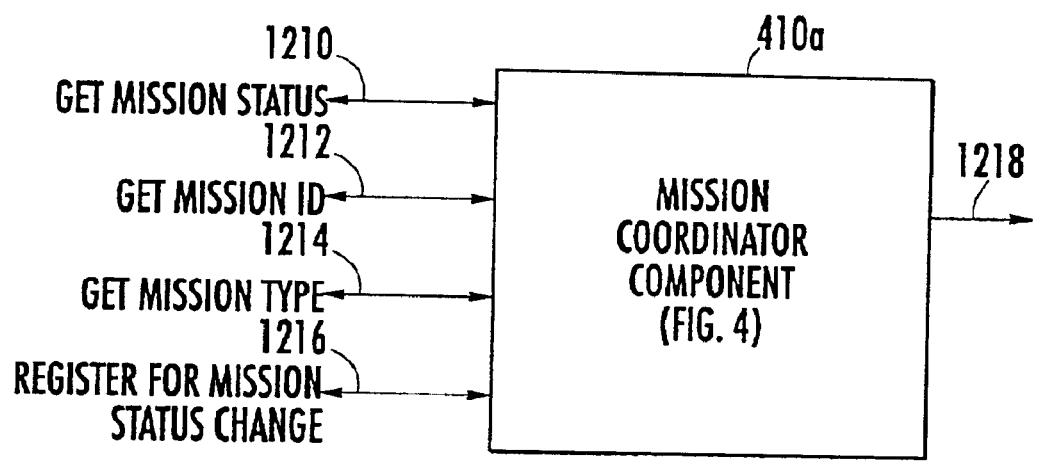
FIG. 12 is a simplified diagram illustrating the mission coordinator component of FIG. 4, which is part of the mission coordination group of components of FIGS. 2a and 2b.

FIG. 12 represents one of the mission coordinator components, and for definiteness, represents mission coordinator component 410a of FIG. 4. The mission coordinator component, as with many of the components described herein, is generated or replicated as required. There will, in general, be one template of the mission coordinator for each different type of mission which is contemplated. For example, there may be one mission coordinator component for self-defense from airborne threats, another for self-defense from underwater threats, possibly one for threat of boarding from a vessel. In addition, a set of mission coordinator components will be available for attack missions, such as attack of land targets, attack of underwater targets, and the like. The particular mission coordinator which is used will, in general, be custom-programmed for the particular vessel and its capabilities, command structure, and missions. However, according to an aspect of the invention, the mission coordinator components respond to particular commands, as follows. In general, the particular commands and the specified responses relate to the status and identification of the mission. For example, it is anticipated that there is always a need for information about the mission status, and this need transcends the particular missions which the command and control system may be required to perform. Among these commands and responses are the getMissionStatus command, which may be, or is, applied to input 1210 from a remote component. The mission coordinator component responds to the getMissionStatus command by returning the current mission status information to the requesting component by way of a bidirectional path. The getMissionID command may be, or is, applied to input 1212 from a remote component of the command and control system. The mission coordinator component 410*a* returns the mission identifier to the requesting component by way of a bidirectional path; this is merely notification of the self-identification of the particular mission coordinator in question. The getMissionType command may be, or is, applied to input 1214 from a remote component of the command and control system. The mission coordinator component returns the mission type to the requesting component by way of a bidirectional path. The registerForMissionStatusChange command may be, or is, applied to input 1216 from a remote component of the command and control system. The mission coordinator component 410*a* notifies the requester of any change to the mission status that may happen in the future, until the requester cancels the registration. An event registration is immediately returned to the requesting component, which identifies the fact that the requesting component has the functionality stored in the mission coordinator component; this registration may be used to cancel the command for notification. The subsequent notification of a change to the mission status, if and when made, may be viewed as exiting from the mission coordinator component 410*a* by way of a path 1218.

Figure 13:
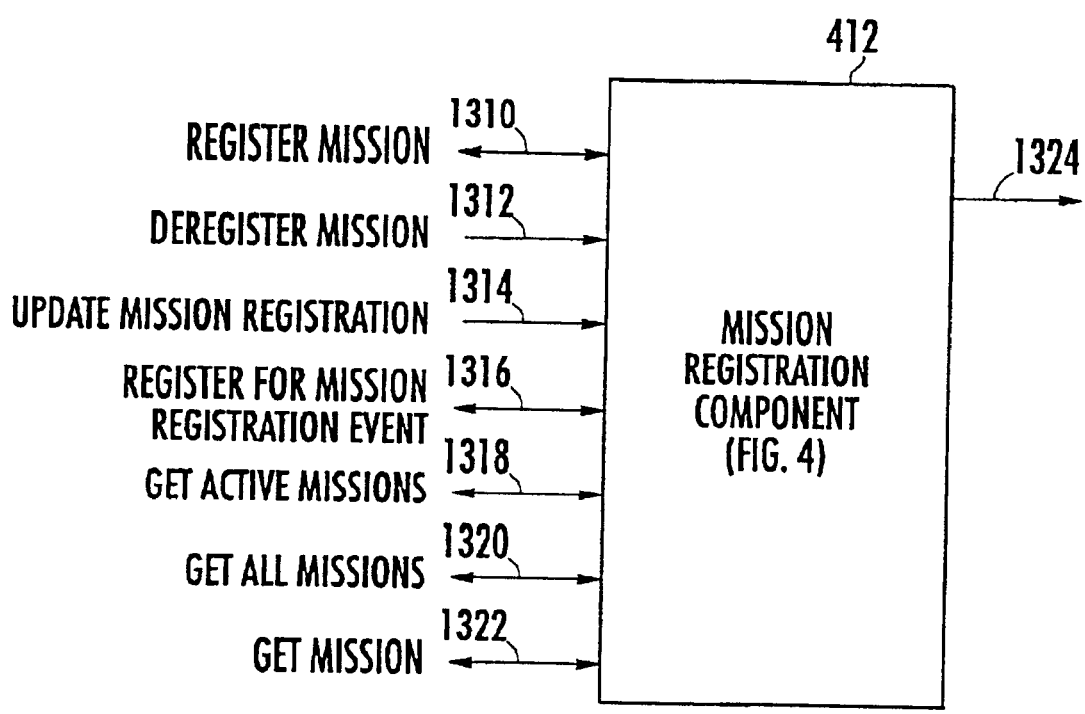
FIG. 13 is a simplified diagram illustrating the mission registration component of FIG. 4, which is part of the mission coordination group of components of FIGS. 2a and 2b.

FIG. 13 represents the mission registration component 412 of FIG. 4. The registerMission command may be, or is, applied to input 1310 from a remote component, which may also specify the reference to the mission coordinator handling the mission. The mission registration component assigns a system unique identifier to the mission and stores the mission coordinator reference, if specified. The mission registration component 412 returns the unique identifier assigned to the mission to the requesting component by way of a bidirectional path. The deregisterMission command may be, or is, applied to input 1312 from a remote component, which also specifies the mission identifier to deregister. The mission registration component 412 changes the mission's status to inactive.

The updateMissionRegistration command may be, or is, applied to input 1314 from a remote component, which also specifies the mission identifier and the reference to the mission coordinator handling the mission. The mission registration component 412 replaces the currently stored mission coordinator reference with the specified mission coordinator reference. The registerForMissionRegistrationEvents command may be, or is, applied to input 1316 from a remote component. The mission registration component 412 responds by notifying the requester of any change to the mission registration status, such as the registration of a new mission, the updating of a mission, or the deregistering of a mission, that may happen in the future, until the requester cancels the registration. An event registration is immediately returned to the requesting component in response to the registerForMissionRegistrationEvents command, which identifies the fact that the requesting component has the functionality stored in the mission registration component; this event registration may be used to cancel the command for notification. The subsequent notification of a change to the mission registration status, if and when made, may be viewed as exiting from the mission registration component 412 by way of a path 1324.

The getActiveMissions command may be, or is, applied to path 1318 of mission registration component 412 of FIG. 13 from a remote component of the command and control system. The mission registration component 412 returns the currently stored mission information for all active missions to the requesting component by way of bidirectional path. An active mission is one that has been registered, but not yet deregistered. The getAllMissions command may be, or is, applied to path 1320 from a remote component. The mission registration component 412 responds by returning the currently stored mission information for all missions to the requesting component by way of bidirectional path. The getMission command may be, or is, applied to path 1322 from a remote component, which also specifies the mission identifier of the mission to return. The mission registration component 412 returns the currently stored mission information for the specified mission to the requesting component by way of bidirectional path.

Figure 14:
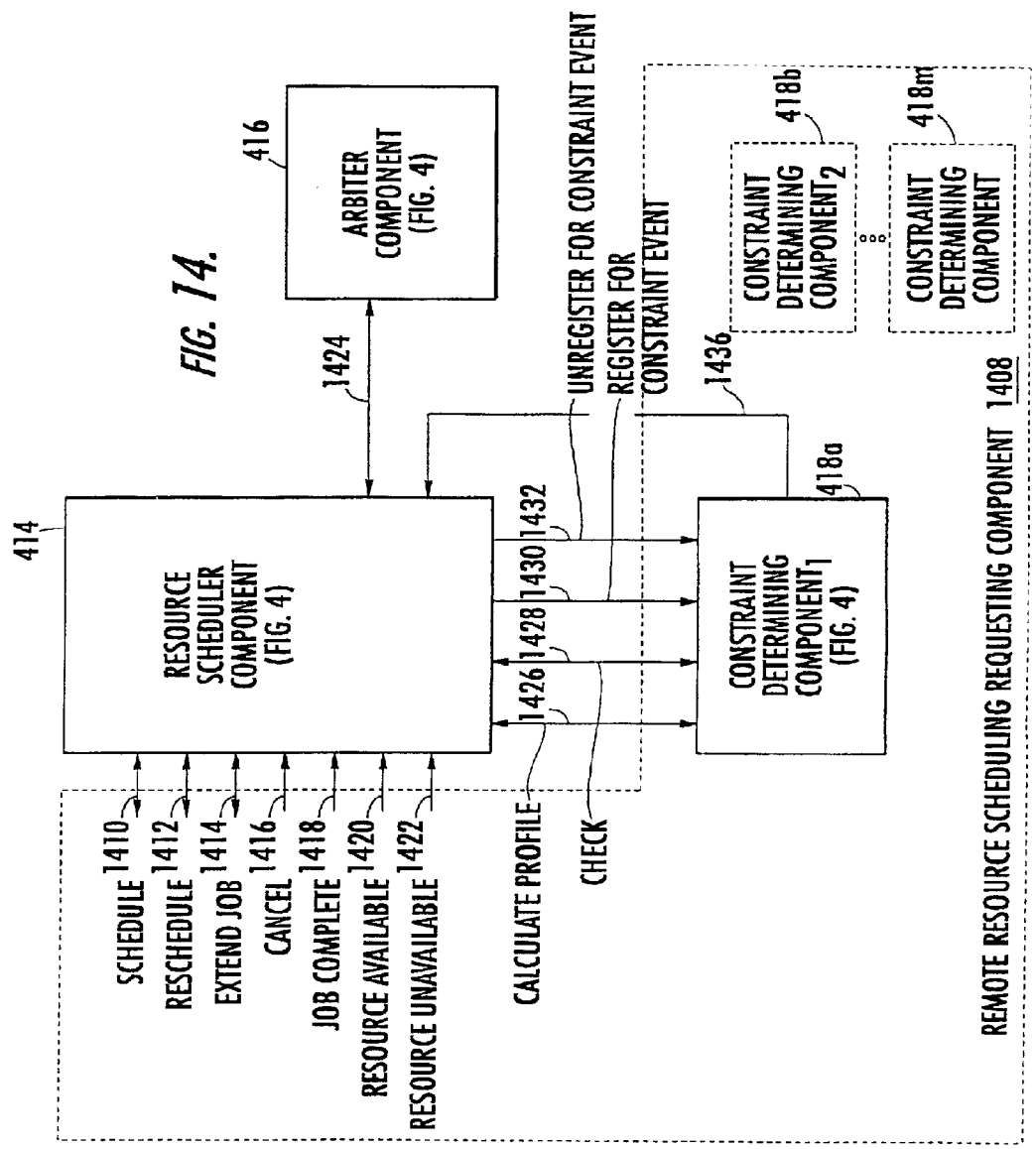
FIG. 14 is a simplified diagram illustrating the resource scheduler, arbiter, and constraint determining components of FIG. 4, which are part of the mission coordination group of components of FIGS. 2a and 2b.

FIG. 14 is a simplified representation of the resource scheduler component 414, the arbiter component 416, and the various constraint determining components 418*a*, 418*b*, . . . , 418*n* of FIG. 4. In FIG. 14, resource scheduler component 414 receives a schedule command from a remote component 1408, which is identified as a resource scheduling requester. The resource scheduling requester 1408 may, and probably does, include one or more constraint determining components, which are illustrated in FIG. 14 as blocks 418*a* and 418*b*. The "schedule" command which may be, or is, applied from the remote resource scheduling requestor to input 1410 of resource scheduler component 414 of FIG. 14 includes an identification of the resource or resources to schedule, the time duration for which the resource or resources must be made available, the priority of the job or mission to be scheduled, and a reference to the requesting component, as well as the time window within which the requested resource is to be made available. In response, the resource scheduler component 414 schedules the resources pursuant to the specified parameters, if possible. In any case, the resource scheduler will return information relating to the time or times during which the requested resource has been scheduled for use by the requesting component. If it has not been possible to schedule the job, a return job information is provided to indicate that the job is not scheduled. This return job information might be in the form of a null value. In a particular embodiment of the invention, the resource scheduler 414 returns a negative time interval to represent the lack of a scheduled time. If there should be a conflict between a current request for a resource and previously scheduled requests for the same resource, the resource scheduler 414 sends a "compare" command to the arbiter component 416 over a path 1424 to command to the arbiter component 416 that it perform a comparison of the priorities of the prior scheduled use of the resource and the newly arrived request for that same resource. The arbiter component 416 makes the comparison of the priorities, makes a decision as to which is superior, and returns that information to the resource scheduler component 414. In some instances, the priorities of the requests may be equal, and the arbiter 416 in this case returns this fact to the scheduler 414, in which case the resource scheduler 414 makes the decision as to priority. In one possible mode of operation, the resource scheduler 414 may use a first-is-higher-priority principle to resolve the conflict, which has at least the advantage of not requiring changes to the current configuration which might propagate through the command and control system. It will be appreciated that the priorities evaluated by the arbiter 416 may be simple or complex within the same system structure. A simple priority may be a simple numeric system, while a complex priority assignment or system may take into account the location of the threat or target, velocity, ship operating mode, and weapon or system latency. The arbiter 416 is the component which is tasked with understanding the various parameters of the priority system.

In FIG. 14, a "reschedule" command may be, or is, applied to path or port 1412 of resource scheduler 414 together with all the information associated with a new scheduling command, and with an identification of the previously scheduled event. The resource scheduler 414 responds by removing the reservations of resources made for the previous scheduling, and by attempting to reschedule based upon the now-current priority and resources required. Again, the resource scheduler returns the scheduling information, including the success or failure of the rescheduling attempt, to the component requesting the rescheduling. An extendJob command may be, or is, applied to path or port 1414 from a remote component, specifying identification of the previously scheduled request, and the amount of extra time for which the resource(s) is or are needed. This command is expected to be used mainly when a previously scheduled job is in progress, and is not proceeding as fast as originally projected. The same resource, then, is required for an additional time period in order to complete the job, either within the same or previously scheduled time interval, or in a newly assigned time interval. The resource scheduler 414 attempts to schedule the additional time, and job information is returned to the requesting component as with the original scheduling, indicating inter alia whether the job scheduling has been accomplished. A "cancel" command may be, or is, applied to port 1416 of resource scheduler 414 to cancel the specified or identified resource scheduling, whereupon the resource scheduler deletes or cancels the identified resource scheduling. A jobComplete command may be, or is, applied to port 1418 of the resource scheduler 414, mainly when the scheduled time has not elapsed, but the job for which the resource was scheduled has been completed. The resource scheduler responds by making the resource available to other components, if needed, for the remaining time previously scheduled. The resourceAvailable command may be, or is, applied to port or path 1420 of the resource scheduler 414 of FIG. 14, specifying the resource which is available. This command would typically be used by the controller of the particular resource, such as a gun fire control system, making that gun resource available to the scheduler. The resource scheduler essentially sets a flag indicating the availability of that resource.

By contrast, a resourceUnavailable command applied to port 1422 of the resource scheduler 414, specifying the resource, and possibly also specifying an expected future time at which the resource will again be available. The resource scheduler responds by clearing its schedule for that resource, and reporting to the schedule-requesting components that the scheduling is no longer active or has failed.

The resource scheduler block 414 of FIG. 14 also communicates, by way of the defined commands, with one or many constraint determining components, one of which is illustrated in FIG. 14 as 418a. Each constraint determining component, such as 418a, is called into existence by a resource scheduling requester, such as 1408. Also, each resource scheduling requester can call into existence one or many such constraint determining components. The constraint determining components impose constraints on the scheduling of the resources. The constraints include those factors which must be taken into account when a resource is scheduled. Such considerations may include the range of a gun, weather conditions, and unexpected target movements. The constraint is made available to the resource scheduler as a list of time intervals during which the constraint will be violated, or a list of "blocked" times. This list is termed the "profile" of the constraint. Thus, if the ship's voyage plan brings it within gun range of a land target within a particular time, the constraint is imposed at all times other than the times at which the target is within range, and changes in the ship's voyage plan will affect the constraint intervals or times. The constraints allow collection or definition of the largely or momentarily uncontrollable factors which dynamically affect the ability to complete a mission. The calculateProfile command may be, or is, applied from a remote component, in the case of FIG. 14 from resource scheduling component 414, to port 1426 of constraint determining component 418a, in response to which the constraint determining component 418a returns the profile of the constraint to the requesting component 414. The resource scheduler 414 is a major user of this information, for aiding in scheduling resources. It will be appreciated that these methods are available to other components of the command and control system. A "check" command may be, or is, applied to port 1428 of the constraint determining component from the resource scheduler or any other remote component, which command also specifies a time interval to check. The constraint determining component 418a will determine if the constraint is violated within the time interval, and return the information to the requester, which in this case is the resource scheduler. A registerForConstraintEvent command may be, or is, applied to port 1430 of the constraint determining component 418a, together with time interval information, in response to which the constraint determining component will continuously monitor or review the scheduled time interval for conflicts, and, should the existence of a future conflict be perceived, notifies, by way of a path 1436, the requesting component, which in this case is the resource scheduler. An unregisterForConstraintEvent command may be, or is, applied to a port 1432 of constraint determining component 418a, in response to which the constraint determining component cancels notifications of future constraint changes to the requester.

Figure 15:
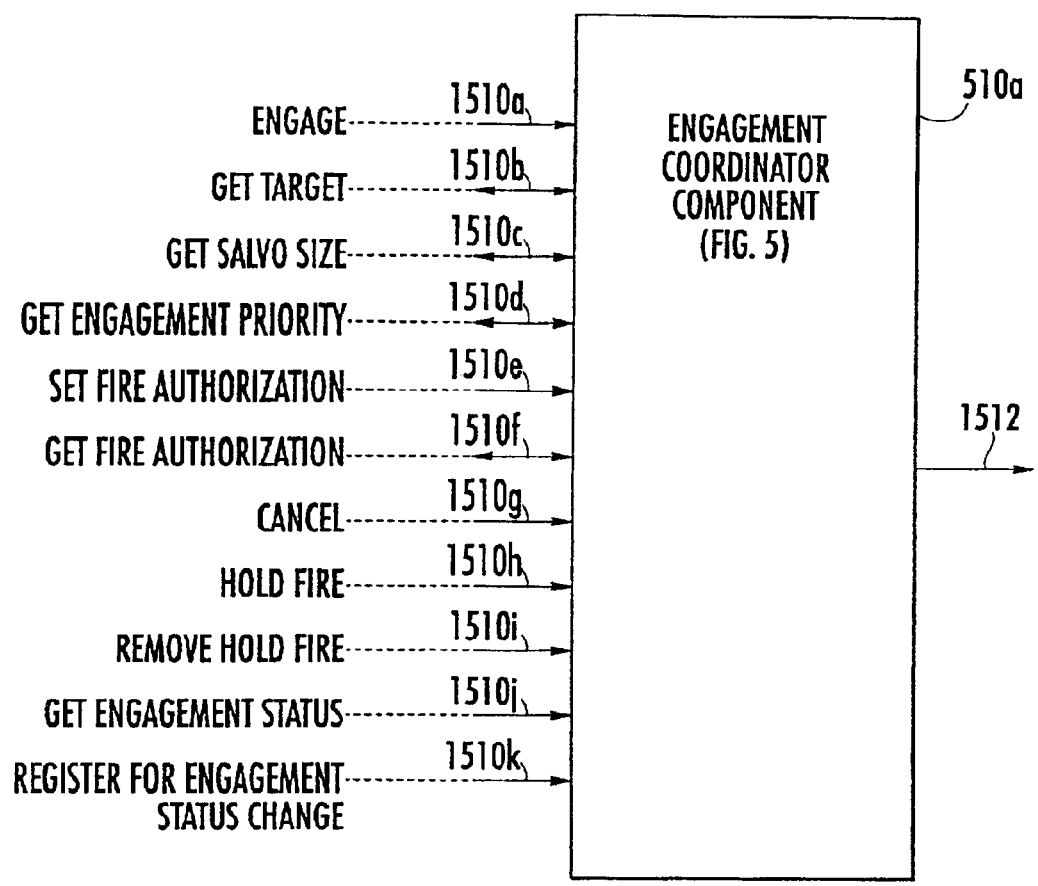
FIG. 15 is a simplified diagram illustrating the engagement coordinator component of FIG. 5, which is part of the weapons control group of components of FIGS. 2a and 2b.

FIG. 15 represents one of the engagement coordinator components, and for definiteness, represents engagement coordinator component 510a of FIG. 5. The engagement coordinator component, as with many of the components described herein, is generated or replicated as required. There will, in general, be one template of the engagement coordinator for each different type of weapon that is available to the command and control system. For example, there may be one engagement coordinator component for a 5-inch gun, another for a specific anti-air warfare missile, and yet another for a decoy launcher.

The particular engagement coordinator which is used will, in general, be determined by a mission coordinator component 410 with help from a weapon selection component 514. According to an aspect of the invention, the engagement coordinator components respond to particular commands. In FIG. 15, engagement coordinator component 510a includes a total of eleven specified or mandatory input ports or paths according to this aspect of the invention, designated 1510*a*, 1510*b*, 1510*c*, 1510*d*, . . . 1510*k*, collected into two groups. The first group includes input ports or paths 1510*a* through 1510*i*, and relates to those input commands which are applicable to commanding and controlling an engagement. The second group includes 1510*j* and 1510*k*, which are associated with those commands which are related to the status of the engagement.

In FIG. 15, the first command, namely "engage," may be, or is, applied to input 1510*a* from a remote component, which also specifies target, engagement data such as the timing of the engagement and the salvo size to use (salvo size is synonymous with the number of projectiles to use in the engagement), and the priority of the engagement. The engagement coordinator 510*a* starts the engagement planning and execution according to the inputted data. This engagement planning may include the scheduling of resources and creation of constraints which depend on how the weapon functions and how it can be used in an engagement. The engagement coordinator returns a reference to its own status interface which is described by inputs 1510*j* and 1510*k*. The getTarget command may be, or is, applied to input 1510*b* from a remote component. The engagement coordinator component 510*a* returns to the requesting component, by way of a bidirectional path, the identification of the target of the engagement it received in association with the "engage" command applied to port 1510*a*. The getSalvoSize command may be, or is, applied to input 1510*c* from a remote component. The engagement coordinator component 510*a* returns to the requesting component, by way of the bidirectional path, the salvo size it received in the "engage" command which was applied to port 1510*a*.

If and when a getEngagementPriority command is applied to input 1510*d* of engagement coordinator component 510*a* of FIG. 15 from a remote component, the engagement coordinator component 510*a* returns to the requesting component, by way of the bidirectional path, the priority which it received in conjunction with the "engage" command applied to port 1510*a*. The setFireAuthorization command, when applied to input 1510*e* from a remote component, specifying whether or not the firing is authorized, results in storage in engagement coordinator 510*a* of the fire authorization, and also results in subsequent weapon firing if the setFireAuthorization command includes authorization. The getFireAuthorization command may be applied to input 1510*f* from a remote component, whereupon the engagement coordinator component 510*a* returns to the requesting component, by way of the bidirectional path, the fire authorization it received in conjunction with the setFireAuthorization command 1510*e*. The "cancel" command may be, or is applied to input 1510*g* from a remote component. The engagement coordinator component 510*a* responds to "cancel" by stopping the engagement without plan to restart, and also returns all scheduled resources, if previously scheduled, to the command and control system 210 or 210'.

If and when the holdFire command is applied to input 1510*h* of engagement coordinator component 510*a* of FIG. 15 from a remote component, the engagement coordinator component 510*a* stops firing if currently firing. If not firing, the engagement coordinator does not start firing when the previously planned firing time arrives. The engagement coordinator 510*a* of FIG. 15 may attempt to extend the use of its scheduled resources with the resource scheduler, if applicable, when the firing is delayed. The time for which extension is attempted is based upon system policy. The extension attempts may be repeated. The attempt to extend is performed by calling extendJob and applying the command to input 1414 of resource scheduler component 414. If and when the removeHoldFire command is applied to input 1510*i* from a remote component, the engagement coordinator 510*a* restarts firing that was delayed due to the receipt of the holdFire command applied to port 1510*h*. If the getEngagementStatus command is applied to input 1510*j* from a remote component, the engagement coordinator component 510*a* responds by returning to the requesting component, by way of the bidirectional path, the current engagement status which includes the salvo size, the planned firing and impact times, and the fire authorization. The registerForEngagementStatusChange command, when applied to input 1510*k* from a remote component, causes the engagement coordinator component 510*a*, in response, to notify the requester of any change to the engagement status that happens in the future, until the requester cancels the registration. An event registration is immediately returned to the requesting component in response to the registerForEngagementStatusChange command, which identifies the fact that the requesting component has the functionality stored in the engagement coordinator component; this registration may be used to cancel the command for notification. The subsequent notification of a change to the engagement status, if and when made, may be viewed as exiting from the engagement coordinator component 510*a* of FIG. 15 by way of a path 1512.

Figure 16:
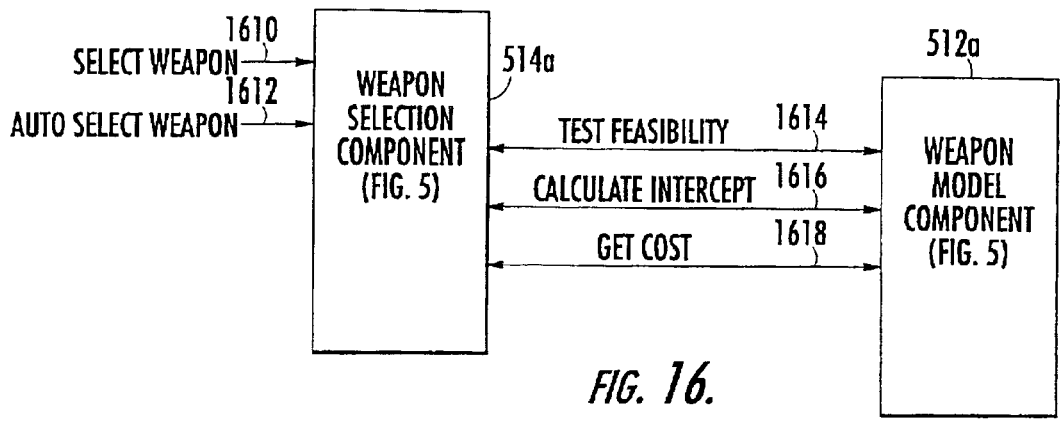
FIG. 16 is a simplified diagram illustrating the weapon selection and weapon model components of FIG. 5, which are parts of the weapons control group of components of FIGS. 2a and 2b.

FIG. 16 represents the details of the remaining two components of the weapons control group of components 216 of FIG. 5, namely the weapon selection component 514 and the weapon model components 512*a*, 512*b*, . . . , 512*n*, this latter being represented in FIG. 15 by a single component, selected as being 512*a* for definiteness. The weapon selection component 514 uses data obtained from the various weapon models to select the most applicable weapon for a target. The weapon selector 514*a* responds to a selectWeapon command applied to input 1610 from a remote component, where the command also specifies the target of the engagement, by determining which of the available weapons of the command and control system can neutralize the given target. This may be accomplished by various means, one of which is to query the weapon models which represent the weapons available in the system for the feasibility of using the weapons which they variously represent against the specified target. This query is shown as a "testFeasibility" path 1614. The weapon selection component could also query the weapon models for their intercept times and cost of use. These queries are shown as 1616 and 1618 respectively. The weapon selection component returns a list of applicable weapons to the requesting component. If no weapons are found to be applicable to the engagement, a null list is returned by a bidirectional path. The autoSelectWeapon command may be applied to input 1612 from a remote component, which also specifies the target of the engagement. The weapon selection component 514*a* responds by determining which one of the available weapons can most effectively neutralize the given target. This determination can take place as described in conjunction with the selectWeapon command applied to port 1612, but takes the further step of returning only that one weapon which is determined to be the most effective in the context. If no weapon is found to be applicable to the engagement, a null value is returned to the requesting component by the bidirectional path or port 1612. The weapon model component, which as mentioned is illustrated as weapons model component 512*a*, responds to a testFeasibility command applied to input port 1614 from a remote component, accompanied by specification of the target of the engagement. In the particular instance, the testFeasibility command comes from weapon selector component 514a. The weapon model 512a determines whether or not the weapon it represents can address the target, and returns that determination to the requesting component by the bidirectional path 1614. When a calculateIntercept command is applied to input 1616 of weapon model 512a from a remote component which also specifies the target of the engagement, the weapon model 512a determines the intercept point and timing and returns this data to the requesting component by bidirectional path 1616. If and when the getCost command is applied to input 1618 from a remote component, the weapon model 512a determines the cost, preferably in US dollars, of using the weapon. The cost could be a calculation of the salvo size multiplied by the cost of each salvo. This cost is then returned to the requesting component by bidirectional path 1618.

Figure 17:
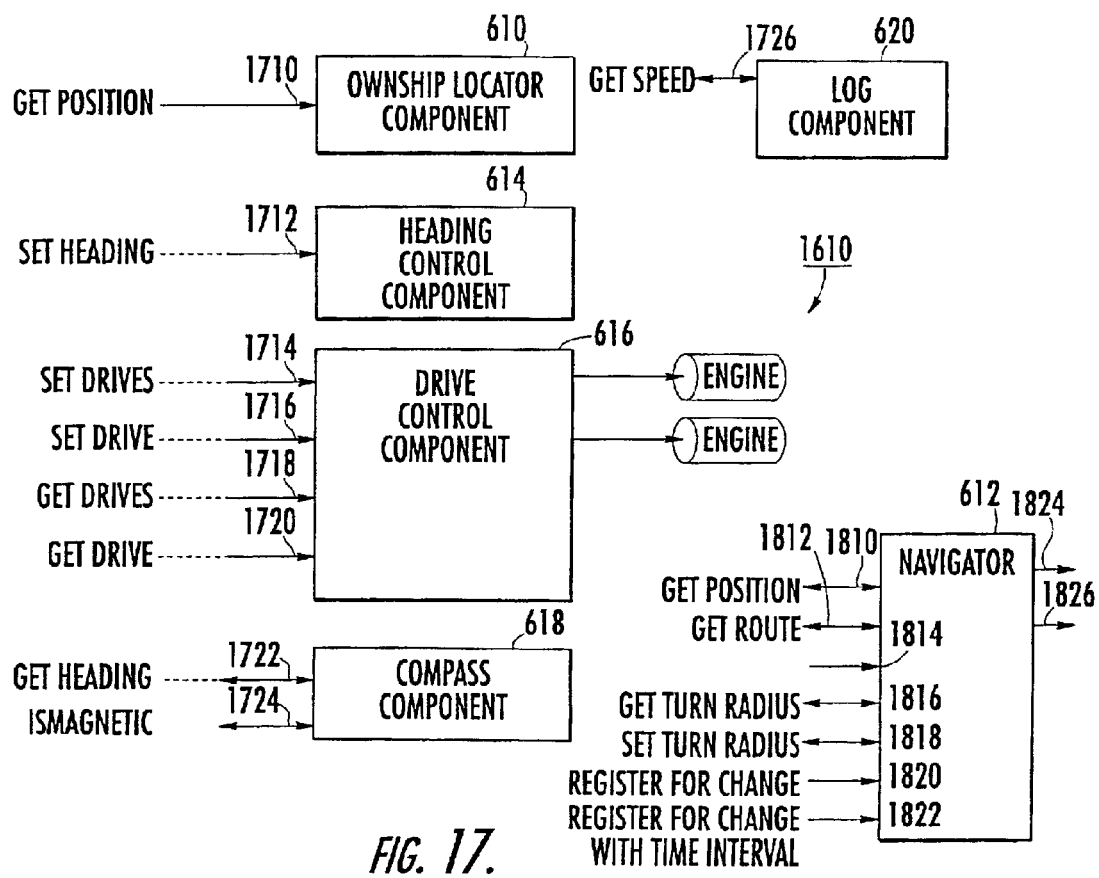
FIG. 17 is a simplified diagram illustrating the ownship locator, heading control, drive control, and compass components of FIG. 6, which are parts of the navigation group of components of FIG. 2b.

The ownship locator component 610 portion of the navigation group of components 216 of FIG. 6, includes, as a minimum, the command input illustrated in FIG. 17. The command, namely getPosition, is applied to input 1710 from a remote component. The ownship locator component 610 returns the current location and kinematics of the ship to the requesting component via bidirectional path 1710. The ownship's position may have been supplied by a device such as a GPS receiver system. The heading control component 614 of FIG. 6 includes at least the command input illustrated in FIG. 17. The setHeading command is applied to input 1712 from a remote component which also specifies the heading to which the ship is to be turned. The heading control component commands the steering device(s) (not illustrated) of the ship to turn to the specified heading.

The drive control component 616 of FIG. 6 includes the command inputs illustrated in FIG. 17. The setDrives command may be, or is, applied to input 1714 from a remote component, which also specifies the drive information which includes, for each drive controller on the ship, the percentage of power to be applied to the drive and the drive direction. The drive direction can be any angle, preferably described in degrees, with zero degrees meaning forward and one hundred eighty degrees meaning reverse. The drive control component 616 commands the drive controller device(s) of the ship to the specified power in the specified direction. These drive control devices may be the ship's engines 1610 as illustrated in FIG. 17. The setDrive (no "s") command, when applied to input 1716 of drive control component 616 of FIG. 17 from a remote component also specifies drive information which includes, for the specified drive controller on the ship, the percentage of power to be applied to the specified drive, together with the drive direction. The drive control component 616 responds by commanding the specified drive controller device of the ship to the specified power in the specified direction. The getDrives command may be applied to input 1718 from a remote component, in response to which the drive control component 616 returns to the requesting component, by way of the bidirectional path 1718, the current state of the drive(s) on the ship, including percentage of power and drive direction. The getDrive (no "s") command, when applied to input 1720 from a remote component also specifies the drive for which the report is desired. The drive control component 616 returns to the requesting component, via bidirectional path 1720, information relating to the current state of the specified drive on the ship, including percentage of power and drive direction. The compass component 618 of FIG. 6 includes at least the command inputs illustrated in FIG. 17.

The getHeading command, if and when it is applied to bidirectional input/path 1722 by a remote component, returns to the requesting component the current reading of the ship's compass. The ismagnetic command may be, or is, applied to input 1724 by a remote component. The compass component 618 returns true if the ship's compass is magnetic and false if the ship's compass is not magnetic.

The log component 620 of FIG. 6, includes the command input illustrated in FIG. 17. The getSpeed command, if and when applied to input 1726 by a remote component, causes the log component to return the current reading of the ship's log to the requesting component via the bidirectional path 1726.

The navigator component 612 of FIG. 6 includes the command input illustrated in FIG. 18. The navigator component 612 provides for the prediction of future ship movement. This prediction is based on information such as a ship's voyage plan which specifies waypoints which the ship is expected to navigate through and the ship's expected speed during that plan or its time of arrival planned for each waypoint or the final destination. Such a voyage plan may be computer-generated or marked on a chart and entered into the computer by ship's personnel. In the absence of such a voyage plan, the navigator component 612 relies on the projection of the ship's current position and kinematics to predict future location. The navigator component 612 can use the own-ship locator component 610 to obtain this information. The getPosition command is applied to input 1810 of navigator component 612 of FIG. 17 by a remote component which also specifies the time in the future for which the position is requested. The navigator component 612 calculates the future position and kinematics as previously described. The navigator returns the future position and kinematics to the requesting component via bidirectional path 1810. The getRoute command may be, or is, applied to input or path 1812 by a remote component, without specification of a time limitation. The navigator component 612 returns the complete list of future waypoints in the voyage plan to the requesting component via bidirectional path 1810. If no voyage plan is known to the navigator, the navigator returns a null route. The getRoute command is applied to input 1814 by a remote component which also specifies a time interval of interest. The navigator component 612 returns the list of waypoints in the voyage plan during the specified time interval to the requesting component via bidirectional path. If no voyage plan is known to the navigator, the navigator returns a null route. The getTurnRadius command may be, or is, applied to input/path 1816 by a remote component. The navigator component 612 returns the currently set turn radius of the ship to the requesting component via bidirectional path 1816. The setTurnRadius command may be, or is, applied to input 1818 by remote component which also specifies the turn radius of the ship. The navigator component 612 stores the turn radius of the ship and uses it in future calculations of the ship's route. The registerForChange command without specification of a time interval of interest may be applied to input 1820 by a remote component. The navigator component 612 notifies the requester of any change to the ship's voyage plan that may happen in the future until the requester cancels the registration. An event registration is immediately returned to the requesting component, which identifies the fact that the requesting component has the functionality stored in the navigator component; this registration may be used to cancel the command for notification. The subsequent notification of a change to the voyage plan, if and when made, may be viewed as exiting from the navigator component 612 by way of a path 1826. The registerForChange command when associated with a time interval of interest is applied to input 1822 by a remote component which also specifies the time interval to monitor for changes. The navigator component 612 notifies the requester of any change to the ship's voyage plan during the specified time interval that may happen in the future until the requester cancels the registration or the time interval expires. An event registration is immediately returned to the requesting component, which identifies the fact that the requesting component has the functionality stored in the navigator component; this registration may be used to cancel the command for notification. The subsequent notification of a change to the voyage plan, if and when made, may be viewed as exiting from the navigator component 612 by way of a path 1824.

Other embodiments of the invention will be apparent to those skilled in the art. For example, it will be apparent that many of the described functions may be distributed differently that is illustrated. For example, the arbiter component 416 of FIG. 4 may be contained within the resource scheduler component 414, and many other such distributions or combinations may be made. While the specific form of the command has been mentioned, the exact command words are only for convenience in keeping track of the commands, in the nature of a mnemonic. Other command words could of course be used, as could completely arbitrary aggregations of alphanumerics denoting the described functions.

Thus, a military command and control system according to an aspect of the invention includes functional portions which respond to a set of or plurality of commands. Certain commands are mandatory. Specific responses are made in response to the mandatory commands. System tracks are handled differently than local tracks. Command and control systems which use the mandatory command structure are more readily upgraded than prior-art integrated command and control systems.

What is claimed is:

1. A military command and control system, comprising:
 a track management group of components, said track management group of components including a track repository component, a system track component, a correlation component, an identification component, and a local track component for each separate track in each said system track component for each system track in said track repository,
  said track repository component being for (a) in response to a newTrack command, temporarily storing a new system track in the track repository, (b) in response to a getTrack command specifying a track, providing a reference to the requested track within said track repository, (c) in response to a getTracks command with specifying criteria, providing a reference to that set of tracks within said track repository which meets said specifying criteria, and if no criteria are specified, providing a reference to all tracks within said track repository, (d) in response to a removeTrack command specifying a track, removing the specified track from the set of tracks in said track repository, (e) in response to a removeTracks command including specifying criteria, removing from said track repository all tracks which meet the specified criteria, (f) in response to a removeAllTracks command, deleting from said track repository all currently stored tracks, (g) in response to a registerForAddEvent command, notifying the requester when a track is added to said track repository, (h) in response to a RegisterForRemoveEvent command, notifying the requester when a track is removed from said track repository,
 each said system track component for (a) in response to a setIdentity command, fusing and/or updating specified new track identity information with currently stored track identity information, (b) in response to a setPosition command, fusing and/or updating new track kinematic information with currently stored track kinematic information, (c) in response to a setCharacteristics command, fusing and/or updating new track characteristics with the currently stored track; (d) in response to a setSize command, fusing and/or updating new track dimension information with the currently stored track dimension information, (e) in response to a getIdentity command, returning track identity data to the requesting component, (f) in response to a getPosition command, returning track kinematic data to the requesting component, (g) in response to a getCharacteristics command, returning track characteristic information to the requesting component, (h) in response to a getSize command, returning track dimension information to the requesting component, (i) in response to setUniqueID command including a specified unique identification, assigning the specified unique identification to the stored track, (j) in response to a getUniqueID command, returning the track identification to the requesting component, (k) in response to a setTrackData command, fusing and/or updating track identity, track position, track characteristics, track size, and track identification with current track data, (l) in response to a getTrackData command, returning to the requesting component track identity, track kinematics, track characteristics, track size, and track identification, (m) in response to a posChangeRegister command, notifying the requester when the track kinematics change in the system track component (n) in response to a IDChangeRegister command, notifying the requestor when the identity of the track changes, (o) in response to a charChangeRegister command, notifying the requestor when the track characteristics change in the track storage, (p) in response to a sizeChangeRegister command, notifying the requesting component when the dimension of the track changes in the track storage, (q) in response to a getLocalTrackRefs command, returning a reference to the set of related local tracks, (r) in response to an addLocalTrackRef command, storing a reference to the specified local track component, (s) in response to a removeLocalTrackRef command, removing the reference to said specified local track component, (t) in response to a getRemoteRef command, returning a reference to the system track component, (u) in response to a setEngagedState command specifying an engaged state, storing the specified engaged state in the system track component, (v) in response to a getEngagedState command, returning the value of the engaged state in the system track component, (w) in response to a refChangeRegister command, notifying the requester when the set of associated local track component references change in the system track component,
 each said local track component for (a) in response to a setIdentity command specifying an identity, storing new track identity information in the local track component, (b) in response to a setPosition command specifying track kinematics, storing new track location and movement information in the local track component, (c) in response to a setCharacteristics command, storing new track characteristics in the local track component; (d) in response to a setSize command together with new dimension information, storing said new track dimension information in local track component, (e) in response to a getIdentity command, returning to the requesting component that track identity data stored in the local track component, (f) in response to a getPosition command, returning to the requesting component that track location and movement data stored in the local track component, (g) in response to a getCharacteristics command, returning track characteristic information to the requesting component, (h) in response to a getSize command, returning track dimension information to the requesting component, (i) in response to setUniqueID command, assigning the specified identification to the stored track, (j) in response to a getUniqueID command, returning the track identification to the requesting component, (k) in response to a setTrackData command, storing track identity, track kinematics, track characteristics, track size, and track identification in the local track component, (l) in response to getTrackData command, returning to the requesting component track identity, track kinematics, track characteristics, track size, and track identification (m) in response to posChangeRegister command, notifying the requestor when the track kinematics change in the local track component (n) in response to a IDChangeRegister command, notifying the requester when the track identity information of the local track component changes, (o) in response to charChangeRegister command, notifying the requestor when the track characteristics change in the local track component, (p) in response to sizeChangeRegister command, notifying the requesting component when the dimension of the track changes in the local track component, (q) in response to getSystemTrackRef command, returning a reference to the system track related to this local track component, (r) in response to setSystemTrackRef command, storing an association between the specified system track and this local track component, (s) in response to getRemoteRef, returning a reference to this local track component, (t) in response to sysTrackRefChangeRegister, notifying the requester when the associated system track changes in the local track component, said correlation component for (a) in response to a correlate command specifying a local track component, correlating said specified local track component with known system track components, if any, in the track repository, resulting in an association between the specified local track component and a system track component being stored in both the local and system track components, (b) in response to a correlateSynch command where a local track component is specified, correlating specified local track component with known system track components in the track repository, resulting in an association between the specified local track component and a system track component being stored in both the local and system track components and returning the associated system track component to the requester, (c) in response to a correlateSynch command where track data is specified, correlating specified track data with known system track components in track repository and returning the associated system track component to the requester;

said identification component for (a) in response to determineIdentity command, performing processing one time in an attempt to determine or refine identification information about the specified system track (b) in response to checkIfFriend command, performing processing one time in an attempt to determine the specified system track component's friend or foe identity (c) in response to continuousCheckIfFriend command, performing processing continually in an attempt to determine the specified system track's friend or foe identity until either the track is determined to be a friend or the requester cancels the request (d) in response to idrecommendation command, validating and storing the friend or foe recommendation in the system track component;

a weapons control group of components, said weapons control group of components including an engagement coordination component, a weapon model component, and a weapon selection component, said engagement coordination component for (a) in response to engage command, performing processing coordinating, scheduling, and tasking resources including at least weapons and sensors to affect engagement against the specified target, (b) in response to getTarget command, returning a reference to the system track component representing the target of engagement to requester (c) in response to getSalvoSize command, returning salvo size being used in engagement to the requester (d) in response to getEngagementPriority command, return priority of engagement to requester (e) in response to setFireAuthorization command, store fire authorization, (f) in response to getFireAuthorization command, return currently stored fire authorization, (g) in response to "cancel" command, performing processing to halt the engagement (h) in response to holdFire command, performing processing to temporarily halt the engagement (i) in response to removeHoldFire command, performing processing to resume the engagement, (j) in response to getEngagementStatus command, returning to the requester the status of the engagement, (k) in response to registerForEngagementStatusChange command, notifying the requester of changes in the engagement status, said weapon model component for (a) in response to testFeasibility command, returning the feasibility of using this weapon against the specified target to the requester, (b) in response to calculateIntercept command, returning information about when and where the weapon will intercept the specified target to the requester, (c) in response to getCost command, returning to the requester cost information about the use of the weapon, said weapon selection component for (a) in response to selectWeapon command, returning a set of weapons which are feasible to use against the specified target to the requester, (b) in response to autoSelectWeapon command, returning the most feasible weapon to use against the specified target to the requester;

a mission coordination group of components, said mission coordination group of components including a mission coordinator component, a resource scheduler component, an arbiter component, a constraint determining component and a mission registration component, said mission coordinator component being for (a) in response to getMissionStatus command, returning mission status information including engagement status to the requester, (b) in response to getMissionID command, returning the system-unique identifier for this mission to the requester, (c) in response to getMissionType command, returning the type of mission to the requester, (d) in response to registerForMissionStatusChange command, notifying the requester whenever the status information of the mission changes, said resource scheduler component being for (a) in response to "schedule" command, attempting to reserve the specified resources at the specified times based on the specified priority, returning the reservation information including the success or failure of the scheduling attempt to the requester, (b) in response to "reschedule" command, removing the reservations on resources previously scheduled for the specified job and then attempting to reschedule the specified resources at the specified times based on the specified priority, returning the scheduling information including the success or failure of the rescheduling attempt to the requester, (c) in response to extendJob command, attempting to extend the reservation on the specified resources based on the specified priority, returning the scheduling information including success or failure of the scheduling attempt to the requester, (d) in response to "cancel" command, removing reservations on resources for the specified job, (e) in response to jobComplete command, removing remaining reservations on resources for the specified job, (f) in response to resourceAvailable command, making specified resource available for scheduling, (g) in response to resourceUnavailable command, making specified resource unavailable for scheduling, removing reservations on the resource, and notifying holders of reservations on the resource that the resource is no longer available, said arbiter component for (a) in response to "compare" command, returning to the requester the higher of the two specified priorities, said constraint determining component for (a) in response to calculateProfile command, returning to the requester the list of time intervals during which the constraint will be violated, (b) in response to "check" command, returning to the requester whether, during the specified time interval, the constraint will be violated or not, (c) in response to registerForConstraintEvent command, notifying the requester when a change has occurred that will cause the constraint to be violated during the specified time interval, (d) in response to unregisterForConstraintEvent command, canceling future notifications to the requester on constraint changes, (e) in response to getFlexibility command, returning to the requester the percentage of time that the constraint will not be violated, said mission registration component being for (a) in response to registerMission command, assigning a mission identifier, storing specified mission information, and returning the identifier to the requester, (b) in response to deregisterMission command, updating the mission status to inactive, (c) in response to updateMissionRegistration command, updating mission information for the specified mission, (d) in response to registerForMissionRegisrationEvents command, notifying the requester when a mission is registered or deregistered, (e) in response to getActiveMissions command, returning the list of all active missions currently registered, (f) in response to getAllMissions command, returning the list of all missions that have been registered whether or not they have since been deregistered, (g) in response to getMission command, returning mission information for the specified mission to the requester.

2. A military command and control system according to claim 1, further comprising a navigation group of components, said navigation group of components including an own-ship locator component, heading control component, drive control component, compass component, log component, and a navigator component, said own-ship locator component being for (a) in response to getPosition command, returning to the requester the location and kinematics of own-ship, said heading control component being for (a) in response to setHeading command, commanding the heading controller of the ship to turn to the specified heading, said drive control component being for (a) in response to setDrives command, commanding the drive controllers of the ship as specified by the requester, (b) in response to setDrive command, commanding the specified drive controller of the ship as specified by the requester, (c) in response to getDrives command, returning to the requester the current settings of the drive controllers of the ship, (d) in response to getDrive command, returning to the requester the current settings of the specified drive controller of the ship, said compass component being for (a) in response to getHeading command, returning to the requester the current reading of the ship's compass, (b) in response to ismagnetic command, returning to the requester whether the ship's compass is magnetic or not, said log component being for (a) in response to getSpeed command, returning to the requester the current reading of the ship's log, said navigator component being for (a) in response to getPosition command, returning to the requester the expected location and kinematics of ownship at the specified future time, (b) in response to getRoute command, returning to the requester the list of navigation waypoints which form the ship's future route, (c) in response to getRoute command with a specified time interval, returning to the requester the list of navigation waypoints which form the ship's route within the specified time interval, (d) in response to getTurnRadius command, returning to the requester the turn radius of ownship, (e) in response to setTurnRadius command, storing the turn radius of ownship, (f) in response to registerForChange command, notifying the requester when the ship's future route changes, (g) in response to registerForChange command where a time interval is specified, notifying the requester when the ship's route is expected to change within the time interval.

3. A military command and control system, comprising:

a track management group of components, said track management group of components including a track repository component, a system track component, a correlation component, an identification component, and a local track component for each separate track in each said system track component for each system track in said track repository, said track repository component being for (a) in response to a newTrack command, temporarily storing a new system track in the track repository, (b) in response to a getTrack command specifying a track, providing a reference to the requested track within said track repository, (c) in response to a getTracks command with specifying criteria, providing a reference to that set of tracks within said track repository which meets said specifying criteria, and if no criteria are specified, providing a reference to all tracks within said track repository, (d) in response to a removeTrack command specifying a track, removing the specified track from the set of tracks in said track repository, (e) in response to a removeTracks command including specifying criteria, removing from said track repository all tracks which meet the specified criteria, (f) in response to a removeAllTracks command, deleting from said track repository all currently stored tracks, (g) in response to a registerForAddEvent command, notifying the requester when a track is added to said track repository, (h) in response to a RegisterForRemoveEvent command, notifying the requester when a track is removed from said track repository, each said system track component being for (a) in response to a setIdentity command, fusing and/or updating specified new track identity information with currently stored track identity information, (b) in response to a setPosition command, fusing andor updating new track kinematic information with currently stored track kinematic information, (c) in response to a setCharacteristics command, fusing and/or updating new track characteristics with the currently stored track; (d) in response to a setSize command, fusing and/or updating new track dimension information with the currently stored track dimension information, (e) in response to a getIdentity command, returning track identity data to the requesting component, (f) in response to a getPosition command, returning track kinematic data to the requesting component, (g) in response to a getCharacteristics command, returning track characteristic information to the requesting component, (h) in response to a getSize command, returning track dimension information to the requesting component, (i) in response to setUniqueID command including a specified unique identification, assigning the specified unique identification to the stored track, (j) in response to a getUniqueID command, returning the track identification to the requesting component, (k) in response to a setTrackData command, fusing and/or updating track identity, track position, track characteristics, track size, and track identification with current track data, (l) in response to a getTrackData command, returning to the requesting component track identity, track kinematics, track characteristics, track size, and track identification, (m) in response to a posChangeRegister command, notifying the requester when the track kinematics change in the system track component (n) in response to a IDChangeRegister command, notifying the requester when the identity of the track changes, (o) in response to a charChangeRegister command, notifying the requester when the track characteristics change in the track storage, (p) in response to a sizeChangeRegister command, notifying the requesting component when the dimension of the track changes in the track storage, (q) in response to a getLocalTrackRefs command, returning a reference to the set of related local tracks, (r) in response to an addLocalTrackRef command, storing a reference to the specified local track component, (s) in response to a removeLocalTrackRef command, removing the reference to said specified local track component, (t) in response to a getRemoteRef command, returning a reference to the system track component, (u) in response to a setEngagedState command specifying an engaged state, storing the specified engaged state in the system track component, (v) in response to a getEngagedState command, returning the value of the engaged state in the system track component, and (w) in response to a refChangeRegister command, notifying the requester when the set of associated local track component references change in the system track component.

* * * * *